United States Patent
Itou et al.

(10) Patent No.: US 11,130,913 B2
(45) Date of Patent: Sep. 28, 2021

(54) LIQUID CRYSTAL ALIGNMENT AGENT, LIQUID CRYSTAL ALIGNMENT FILM, LIQUID CRYSTAL ELEMENT, AND POLYMER

(71) Applicant: JSR CORPORATION, Tokyo (JP)

(72) Inventors: Ken-ichi Itou, Tokyo (JP); Yoshitaka Murakami, Tokyo (JP); Youhei Nobe, Tokyo (JP); Takashi Okada, Tokyo (JP)

(73) Assignee: JSR CORPORATION, Tokyo (JP)

( * ) Notice: Subject to any disclaimer, the term of this patent is extended or adjusted under 35 U.S.C. 154(b) by 301 days.

(21) Appl. No.: 16/342,979

(22) PCT Filed: Oct. 19, 2017

(86) PCT No.: PCT/JP2017/037832
§ 371 (c)(1),
(2) Date: Apr. 18, 2019

(87) PCT Pub. No.: WO2018/074546
PCT Pub. Date: Apr. 26, 2018

(65) Prior Publication Data
US 2021/0198577 A1    Jul. 1, 2021

(30) Foreign Application Priority Data
Oct. 20, 2016 (JP) .............. JP2016-206306

(51) Int. Cl.
| C09K 19/56 | (2006.01) |
| C08L 79/08 | (2006.01) |
| C09K 19/34 | (2006.01) |
| C09K 19/38 | (2006.01) |

(52) U.S. Cl.
CPC .............. *C09K 19/56* (2013.01); *C08L 79/08* (2013.01); *C09K 19/3411* (2013.01); *C09K 19/3804* (2013.01); *C09K 2019/3413* (2013.01); *C09K 2019/3419* (2013.01); *C09K 2323/00* (2020.08); *C09K 2323/02* (2020.08); *C09K 2323/027* (2020.08)

(58) Field of Classification Search
CPC .............. C09K 19/56; C09K 19/3411; C09K 19/3804; C09K 2019/3419; C09K 2019/3413; C09K 2323/02; C09K 2323/027; C09K 2323/00; C08L 79/08
USPC .................. 428/1.2, 1.26, 1.1; 349/123, 135
See application file for complete search history.

(56) References Cited

U.S. PATENT DOCUMENTS

| 2013/0331481 A1* | 12/2013 | Yamamoto | ............. C08L 77/06 523/351 |
| 2014/0173893 A1 | 6/2014 | Nagao et al. | |

FOREIGN PATENT DOCUMENTS

| CN | 103748506 | 4/2014 |
| JP | 2962473 | 10/1999 |
| JP | 3612308 | 1/2005 |
| JP | 2012037868 | 2/2012 |
| JP | 2014132326 | 7/2014 |
| JP | 5790156 | 10/2015 |
| JP | 2016006473 | 1/2016 |
| JP | 2016029465 | 3/2016 |
| JP | 2016079189 A * | 5/2016 |
| JP | 5967094 | 8/2016 |
| KR | 20120007969 | 1/2012 |
| KR | 20140041828 | 4/2014 |
| TW | 201319165 | 5/2013 |
| WO | 2015122334 | 8/2015 |

OTHER PUBLICATIONS

"Office Action of Japan Counterpart Application", dated Aug. 27, 2019, with English translation thereof, p. 1-p. 10.
Office Action of Japan Counterpart Application, with English translation thereof, dated Jan. 7, 2020, pp. 1-8.
"Office Action of Korea Counterpart Application", dated Jun. 9, 2020, with English translation thereof, pp. 1-20.
"International Search Report (Form PCT/ISA/210) of PCT/JP2017/037832", dated December 5, 2017, with English translation thereof, pp. 1-2.
"Office Action of Taiwan Counterpart Application", dated Dec. 25, 2020, with English translation thereof, pp. 1-11.
"Office Action of China Counterpart Application", dated Apr. 22, 2021, with English translation thereof, pp. 1-15.

* cited by examiner

*Primary Examiner* — Ruiyun Zhang
(74) *Attorney, Agent, or Firm* — JCIPRNET

(57) ABSTRACT

Provided is a liquid crystal alignment agent that makes it possible to obtain a liquid crystal alignment film having a superior balance among solvent resistance, liquid crystal alignment properties, and voltage holding ratio. The liquid crystal alignment agent contains a polymer [P] including: at least one ring structure of an oxetane ring and an oxirane ring; (B) a functional group that reacts with at least one of the oxetane ring and the oxirane ring by heating; and (C) an optically aligning group.

8 Claims, No Drawings

LIQUID CRYSTAL ALIGNMENT AGENT, LIQUID CRYSTAL ALIGNMENT FILM, LIQUID CRYSTAL ELEMENT, AND POLYMER

This application is a 371 application of the international PCT application serial no. PCT/JP2017/037832, filed on Oct. 19, 2017, which claims the priority benefit of Japan application no. 2016-206306, filed on Oct. 20, 2016. The entirety of each of the abovementioned patent applications is hereby incorporated by reference herein and made a part of this specification.

TECHNICAL FIELD

The present disclosure relates to a liquid crystal alignment agent, a liquid crystal alignment film, a liquid crystal element, and a polymer.

BACKGROUND ART

As a liquid crystal element, various liquid crystal elements such as a liquid crystal element in a horizontal alignment mode using a nematic liquid crystal having positive dielectric anisotropy, which is represented by a Twisted Nematic (TN) type, a Super Twisted Nematic (STN) type, or the like; a vertical alignment (VA) type liquid crystal element in a vertical (homeotropic) alignment mode using a nematic liquid crystal having negative dielectric anisotropy; and the like are known. These liquid crystal elements have a liquid crystal alignment film having a function of aligning liquid crystal molecules in a certain direction. In general, a liquid crystal alignment film is formed using a liquid crystal alignment agent obtainable by dissolving polymer components in an organic solvent.

As a method for imparting a liquid crystal alignment capacity to a polymer thin film formed by using a liquid crystal alignment agent, an optical alignment method has been proposed as an alternative technique to a rubbing method. An optical alignment method is a method for imparting anisotropy to a film by irradiating a radiation sensitive organic thin film formed on a substrate with polarized or non-polarized radiation, thereby controlling the alignment of the liquid crystal. According to this method, generation of dust and static electricity in a process can be curbed, and generation of display defects and a reduction in yield can be curbed, in contrast to a rubbing method of the related art. In addition, this method is advantageous in that a liquid crystal alignment capacity can be uniformly imparted to an organic thin film formed on a substrate.

In the related art, various liquid crystal alignment agents have been proposed as a liquid crystal alignment agent for forming a liquid crystal alignment film by an optical alignment method (refer to, for example, Patent Literature 1 and 2). Patent Literature 1 discloses an optical alignment composition which contains a first polymer including poly (maleimide) and poly(maleimide-styrene) in a main chain, in which a photosensitive group is introduced into a side chain; and a second polymer having a long chain alkyl group in a side chain. In addition, Patent Literature 2 discloses a liquid crystal alignment agent which contains a copolymer having a structural unit having a styrene skeleton as a main chain and a cinnamic acid structure in a side chain, and a structural unit having a maleimide skeleton as a main chain and a cinnamic acid structure in a side chain.

REFERENCE LIST

Patent Literature

[Patent Literature 1]
Japanese Patent No. 2962473
[Patent Literature 2]
Japanese Patent No. 3612308

SUMMARY OF INVENTION

Technical Problem

During a manufacturing process of a liquid crystal element, for example, chemical treatment with a solvent, acid, alkaline solution, or the like may be performed in some cases. For this reason, a liquid crystal alignment film is required to have solvent resistance in order to prevent alteration during the manufacturing process and a deterioration in quality. However, the liquid crystal alignment films obtained in Patent Literature 1 and 2 cannot necessarily be said to have sufficient solvent resistance.

Furthermore, in recent years, large-screen and high-definition liquid crystal televisions have become mainstream and small display terminals such as smartphones and tablet PCs have become widespread, and this has brought a greater demand for higher quality in a liquid crystal panel. Accordingly, while improving solvent resistance, a liquid crystal alignment film to be obtained is also required to have excellent display characteristics such as liquid crystal alignment properties and voltage holding ratio in order to secure display quality.

The present disclosure has been made in view of the above circumstances, and an object thereof is to provide a liquid crystal alignment agent capable of obtaining a liquid crystal alignment film having an excellent balance between solvent resistance, liquid crystal alignment properties, and voltage holding ratio.

Solution to Problem

According to the present disclosure, the following means are provided.

[1] A liquid crystal alignment agent, includes a polymer [P] having at least one ring structure (A) of an oxetane ring and an oxirane ring; a functional group (B) that reacts with at least one of the oxetane ring and the oxirane ring by heating; and an optically aligning group (C).

[2] A liquid crystal alignment film which is formed using the liquid crystal alignment agent according to [1].

[3] A liquid crystal element including the liquid crystal alignment film according to [2].

[4] A polymer includes at least one ring structure (A) of an oxetane ring and an oxirane ring; a functional group (B) that reacts with at least one of the oxetane ring and the oxirane ring by heating; and an optically aligning group (C).

Advantageous Effects of Invention

According to the liquid crystal alignment agent containing the polymer [P], it is possible to obtain a liquid crystal alignment film having favorable solvent resistance, and it is possible to obtain a liquid crystal element having favorable liquid crystal alignment properties and voltage holding ratio.

DESCRIPTION OF THE EMBODIMENTS

<<Liquid Crystal Alignment Agent>>

A liquid crystal alignment agent of the present disclosure contains a polymer [P] that has at least one ring structure (A) of an oxetane ring and an oxirane ring; a functional group (B) that reacts with at least one of the oxetane ring and the oxirane ring by heating; and an optically aligning group (C). Hereinafter, each component contained in the liquid crystal alignment agent of the present disclosure and other optional components to be blended in as necessary will be described.

<Polymer [P]>

The polymer [P] preferably has at least one ring structure of an oxetane ring and an oxirane ring (hereinafter referred to as "ring structure (A)") in the side chain. The ring structure (A) that the polymer [P] has is preferably an oxetane ring from the viewpoint of high reactivity.

Examples of functional groups that react with at least one of an oxetane ring and an oxirane ring by heating (hereinafter referred to as "functional group (B)") include a carboxyl group, a hydroxyl group, an isocyanate group, and an amino group, and a group in which each of these groups is protected with a protective group, an alkoxymethyl group, and the like. Among them, the functional group (B) is preferably at least one kind selected from the group consisting of a carboxyl group and a protected carboxyl group (hereinafter referred to as "protected carboxyl group") from the viewpoint of favorable storage stability, and high reactivity with an oxetane ring and an oxirane ring by heating.

The protected carboxyl group is not particularly limited as long as it generates a carboxyl group by being eliminated due to heat. Preferable specific examples of protected carboxyl groups include a structure represented by Formula (3), an acetal ester structure of a carboxylic acid, a ketal ester structure of a carboxylic acid, and the like.

[Chem. 1]

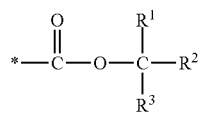

(3)

(In Formula (3), $R^1$, $R^2$, and $R^3$ each independently represent an alkyl group having 1 to 10 carbon atoms or a monovalent alicyclic hydrocarbon group having 3 to 20 carbon atoms; or $R^1$ and $R^2$ are bonded to each other to form a divalent alicyclic hydrocarbon group or a cyclic ether group having 4 to 20 carbon atoms together with a carbon atom to which $R^1$ and $R^2$ are bonded, and $R^3$ is an alkyl group having 1 to 10 carbon atoms, an alkenyl group having 2 to 10 carbon atoms, or an aryl group having 6 to 20 carbon atoms; and "*" represents a binding site.)

The optically aligning group is preferably a functional group that imparts anisotropy to a film by a photoisomerization reaction due to light irradiation, a photodimerization reaction, a photo-Fries rearrangement reaction, or a photolysis reaction. Specific examples of optically aligning groups that the polymer [P] has include an azobenzene-containing group containing azobenzene or a derivative thereof as a basic skeleton, a cinnamic acid structure-containing group containing cinnamic acid or a derivative thereof (cinnamic acid structure) as a basic skeleton, a chalcone-containing group containing a chalcone or a derivative thereof as a basic skeleton, a benzophenone-containing group containing benzophenone or a derivative thereof as a basic skeleton, a coumarin-containing group containing coumarin or a derivative thereof as a basic skeleton, a polyimide-containing structure containing a polyimide or a derivative thereof as a basic skeleton, and the like. Among them, the optically aligning group is preferably a cinnamic acid structure-containing group, and is specifically preferably a group containing a cinnamic acid structure represented by Formula (1) as a basic skeleton, in terms of high sensitivity with respect to light and easy introduction into a polymer side chain.

[Chem. 2]

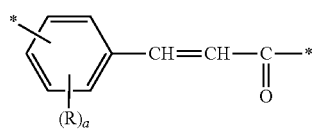

(1)

(In Formula (1), R represents an alkyl group having 1 to 10 carbon atoms which may have a fluorine atom or a cyano group, an alkoxy group having 1 to 10 carbon atoms which may have a fluorine atom or a cyano group, a fluorine atom, or a cyano group; a is an integer of 0 to 4; a plurality of R's may be the same as or different from each other when a is 2 or more; and "*" represents a binding site.)

In the structure represented by Formula (1), it is preferable that one of two binding sites "*" be bonded to a group represented by Formula (4). This case is preferable because it is then possible to improve liquid crystal alignment properties of a liquid crystal element obtained.

[Chem. 3]

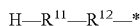

(4)

(In Formula (4), $R^{11}$ represents a phenylene group, a biphenylene group, a terphenylene group, or a cyclohexylene group, and a ring portion may have an alkyl group having 1 to 10 carbon atoms, an alkoxy group having 1 to 10 carbon atoms, an alkyl group having 1 to 10 carbon atoms in which at least one hydrogen atom is substituted by a fluorine atom or a cyano group, an alkoxy group having 1 to 10 carbon atoms in which at least one hydrogen atom is substituted by a fluorine atom or a cyano group, a fluorine atom, or a cyano group; $R^{12}$ is a single bond, an alkanediyl group having 1 to 3 carbon atoms, an oxygen atom, a sulfur atom, —CH=CH—, —NH—, —COO—, or —OCO— when $R^{12}$ is bonded to a phenyl group in Formula (1), and $R^{12}$ is a single bond, an alkanediyl group having 1 to 3 carbon atoms, an oxygen atom, a sulfur atom, or —NH— when $R^{12}$ is bonded to a carbonyl group in Formula (1); and "*" represents a binding site.)

A main skeleton of the polymer [P] is not particularly limited but is preferably a polymer having a constitutional unit derived from a monomer having a polymerizable unsaturated bond, from the viewpoint that it is then possible to improve solvent resistance, liquid crystal alignment properties, and voltage holding characteristics of the liquid crystal alignment film in a well-balanced manner, and from the viewpoint that it is possible to easily introduce the ring structure (A), the functional group (B), and the optically aligning group (C). In other words, the polymer [P] is preferably a polymer that has a constitutional unit derived from a monomer having a polymerizable unsaturated bond, and has the ring structure (A), the functional group (B), and the optically aligning group (C) (hereinafter referred to as "polymer [P1]").

Regarding the polymer [P1], examples of polymerizable unsaturated bonds that a monomer has include a carbon-carbon double bond contained in a (meth)acryloyl group, an allyl group, a vinylphenyl group, a maleimide group, and the like. In the present specification, the meaning of a "maleimide group" includes not only a group from which a hydrogen atom bonded to a nitrogen atom in maleimide has been removed (a group represented by Formula (z-1-1)) but also a group composed of a structure derived from a ring-opening form of maleimide (a group represented by Formula (z-4-1)). A "vinylphenyl group" is a group in which at least one hydrogen atom has been removed from a benzene ring of styrene, and is represented by, for example, Formula (z-5-1). A benzene ring that a vinylphenyl group has may have a substituent such as a methyl group, an ethyl group, and a fluorine atom.

[Chem 4.]

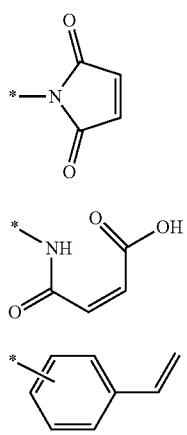

(z-1-1)

(z-4-1)

(z-5-1)

The polymer [P1] is preferably a (meth)acrylic polymer from the viewpoint that effects of improving solvent resistance are substantial. In addition, the polymer [P1] is preferably at least one kind selected from the group consisting of a maleimide polymer, a styrene polymer, and a styrene-maleimide polymer, is more preferably at least one kind selected from the group consisting of a maleimide polymer and a styrene-maleimide polymer, and is particularly preferably a styrene-maleimide polymer, from the viewpoint that effects of improving solvent resistance can be obtained, and a liquid crystal element having an excellent voltage holding ratio can be obtained.

A (meth)acrylic polymer as the polymer [P1] may only have a structural unit derived from a monomer having a (meth)acryloyl group (hereinafter referred to as a "(meth)acrylic compound"), or may further have a structural unit derived from a monomer other than a (meth)acrylic compound (for example, an aromatic vinyl compound, a conjugated diene compound, and the like). A content of a structural unit derived from a (meth)acrylic compound is preferably 50 mol % or more, is more preferably 60 mol % or more, and is even more preferably 70 mol % or more, with respect to all structural units of the (meth)acrylic polymer.

A styrene-maleimide polymer as the polymer [P1] may only have a structural unit derived from a monomer having a styrene group (hereinafter referred to as a "styrene compound") and a structural unit derived from a monomer having a maleimide group (hereinafter referred to as "maleimide compound"), or may further contain a structural unit derived from a monomer other than a styrene compound and a maleimide compound (for example, a (meth)acrylic compound, a conjugated diene compound, and the like).

A content of a structural unit derived from a styrene compound is preferably 2 mol % or more, is more preferably 2 to 80 mol %, and is even more preferably 5 to 70 mol %, with respect to all structural units of a styrene-maleimide polymer. In addition, a content of a structural unit derived from a maleimide compound is preferably 2 mol % or more, is more preferably 2 to 85 mol %, and is even more preferably 2 to 80 mol %, with respect to all structural units of a styrene-maleimide polymer.

In a case where the polymer [P1] is a maleimide polymer, the maleimide polymer may only have a structural unit derived from a maleimide compound, or may further have a structural unit derived from a monomer other than a maleimide compound (for example, a (meth)acrylic compound, a conjugated diene compound, and the like). In a maleimide polymer, a content of a structural unit derived from a maleimide compound is 100 mol % or less, is preferably 1 to 90 mol %, and is more preferably 2 to 80 mol %, with respect to all structural units of the maleimide polymer.

A method for obtaining the polymer [P1] is not particularly limited. Examples thereof include a method in which the polymer [P1] is obtained by polymerization using monomers having the ring structure (A), the functional group (B), and the optically aligning group (C) in the same or different molecules (hereinafter referred to as "specific monomers"). Among them, the polymer [P1] is preferably a polymer having a structural unit derived from a monomer (m1) having the ring structure (A), a structural unit derived from a monomer (m2) having the functional group (B), and a structural unit derived from a monomer (m3) having the optically aligning group (C), from the viewpoint that introduction efficiency of the ring structure (A), the functional group (B), and the optically aligning group (C) is high, and effects of improving liquid crystal alignment properties and voltage holding characteristics are substantial.

Among specific monomers, examples of the monomer (m1) having the ring structure (A) include (meth)acrylic compounds such as glycidyl (meth)acrylate, glycidyl α-ethylacrylate, glycidyl α-n-propylacrylate, glycidyl α-n-butylacrylate, 3,4-epoxybutyl (meth)acrylate, 3,4-epoxybutyl α-ethylacrylate, 3,4-epoxycyclohexylmethyl (meth)acrylate, 6,7-epoxyheptyl (meth)acrylate, 6,7-epoxyheptyl α-ethylacrylate, 4-hydroxybutyl acrylate glycidyl ether, and (3-ethyloxetan-3-yl)methyl (meth)acrylate; and styrene compounds such as 4-vinyl-1-glycidyloxymethylbenzene and 3-vinyl-1-glycidyloxymethylbenzene.

Examples of the monomer (m2) having the functional group (B) include carboxyl-containing groups such as (meth)acrylic acid, α-ethylacrylic acid, maleic acid, fumaric acid, vinylbenzoic acid, crotonic acid, citraconic acid, mesaconic acid, itaconic acid, 3-maleimidobenzoic acid, and 3-maleimidopropionic acid; unsaturated polycarboxylic anhydrides such as maleic anhydride;

protected-carbonyl-group-containing compounds represented by each of Formulas (m2-1) to (m2-12); and the like.

[Chem. 5]

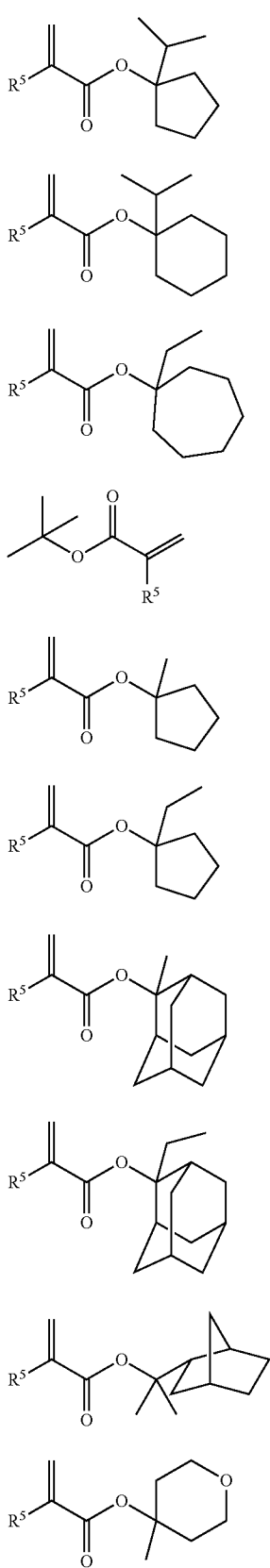

(m2-1)
(m2-2)
(m2-3)
(m2-4)
(m2-5)
(m2-6)
(m2-7)
(m2-8)
(m2-9)
(m2-10)

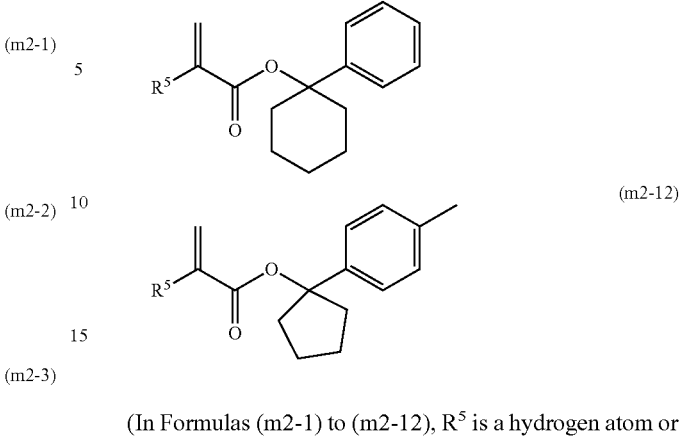

(m2-11)
(m2-12)

(In Formulas (m2-1) to (m2-12), $R^5$ is a hydrogen atom or a methyl group.)

Examples of the monomer (m3) having the optically aligning group (C) include a compound represented by Formula (5), and the like.

[Chem. 6]

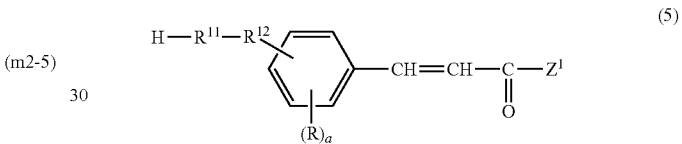

(5)

(In Formula (5), $Z^1$ is a monovalent organic group having a polymerizable unsaturated bond; R and a have the same meanings as in Formula (1); and $R^{11}$ and $R^{12}$ have the same meanings as in Formula (4).)

In the present specification, "(meth)acrylic" means acrylic and methacrylic.

$Z^1$ in Formula (5) is preferably any one of Formulas (z-1) to (z-5).

[Chem. 7]

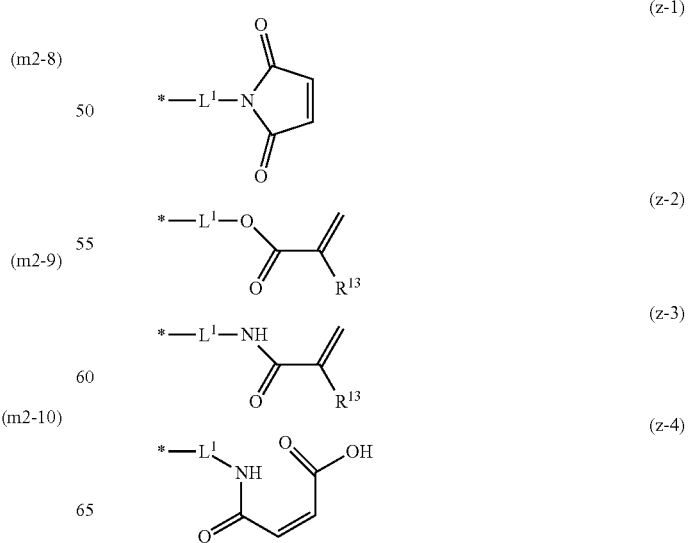

(z-1)
(z-2)
(z-3)
(z-4)

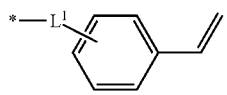

(z-5)

(In the formula, $L^1$ is a divalent linking group; $R^{13}$ is a hydrogen atom or a methyl group; and "*" represents a binding site.)

In Formulas (z-1) to (z-5), a divalent linking group of $L^1$ is preferably a divalent hydrocarbon group having 1 to 20 carbon atoms or a group in which at least one methylene group of the hydrocarbon group is substituted by —O—, —CO—, or —COO—. Specific examples of hydrocarbon groups of $L^1$ include a divalent chain hydrocarbon group, an alicyclic hydrocarbon group, and an aromatic hydrocarbon group. In the present specification, a "chain hydrocarbon group" means a linear hydrocarbon group and a branched hydrocarbon group which does not have a cyclic structure in the main chain and is constituted only by a chain structure. However, the chain hydrocarbon group may be saturated or unsaturated. An "alicyclic hydrocarbon group" means a hydrocarbon group containing only an alicyclic hydrocarbon structure as a ring structure and not having an aromatic ring structure. However, the alicyclic hydrocarbon group is not required to be constituted only by a structure of alicyclic hydrocarbon, and may also include an alicyclic hydrocarbon group having a chain structure in a part thereof. An "aromatic hydrocarbon group" means a hydrocarbon group having an aromatic ring structure as a ring structure. However, the aromatic hydrocarbon group is not required to be constituted only by an aromatic ring structure, and may contain a chain structure or a structure of an alicyclic hydrocarbon in a part thereof. $Z^1$ is preferably a group represented by Formula (z-1) or Formula (z-4) from the viewpoint that effects of improving solvent resistance can be obtained, and a liquid crystal element having an excellent voltage holding ratio can be obtained. As the monomer (m3) having the optically aligning group (C), a monomer having a fluorine atom or a monomer not having a fluorine atom may be used.

In a case of synthesizing the polymer [P1], a proportion of the monomer (m1) having the ring structure (A) used, is preferably 1 to 60 mol %, is more preferably 5 to 55 mol %, and is even more preferably 10 to 50 mol % with respect to a total amount of monomers used for synthesis of the polymer [P1].

A proportion of the monomer (m2) having the functional group (B) used, is preferably 1 to 90 mol %, is more preferably 5 to 90 mol %, and is even more preferably 10 to 80 mol % with respect to a total amount of monomers used for synthesis of the polymer [P1].

A content of the monomer (m3) having the optically aligning group (C) used, is preferably 1 to 70 mol %, is more preferably 3 to 60 mol %, and is even more preferably 4 to 60 mol % with respect to a total amount of monomers used for synthesis of the polymer [P1].

The monomer (m3) having the optically aligning group (C) preferably contains a maleimide compound in at least a part thereof. In a case where a maleimide compound having the optically aligning group is used as the monomer (m3), a proportion thereof used is preferably 2 to 70 mol % and is particularly preferably 4 to 60 mol % with respect to a total amount of monomers used for synthesis of the polymer [P1].

In the above-described polymerization, a monomer having neither the ring structure (A), nor the functional group (B), nor the optically aligning group (C) (hereinafter referred to as "other monomers") may be used in combination. Examples of other monomers include (meth)acrylic compounds such as alkyl (meth)acrylate, cycloalkyl (meth) acrylates, benzyl (meth)acrylate, 2-ethylhexyl (meth)acrylate, trifluoromethyl (meth)acrylate, and 2,2,2-trifluoroethyl (meth)acrylate; aromatic vinyl compounds such as styrene, methylstyrene, and divinylbenzene; conjugated diene compounds such as 1,3-butadiene and 2-methyl-1,3-butadiene; maleimide compounds such as N-methyl maleimide, N-cyclohexyl maleimide, and N-phenyl maleimide; and the like. Regarding the other monomers, one kind may be used alone, or two or more kinds thereof may be used in combination. A proportion of other monomers used is preferably 30 mol % or less and is more preferably 20 mol % or less with respect to a total amount of monomers used for synthesis of the polymer [P1].

A case of using a monomer having a fluorine atom as another monomer, is preferable from the viewpoint that a pretilt angle can be easily adjusted. In the case of using the monomer having a fluorine atom as another monomer, a proportion thereof used is appropriately set according to a size and the like of a desired pretilt angle, but is preferably 1 to 40 mol % and more preferably 2 to 30 mol % with respect to a total amount of monomers used for the synthesis of the polymer [P1].

The polymer [P1] can be obtained by, for example, polymerizing a monomer having a polymerizable unsaturated bond in the presence of a polymerization initiator. As the polymerization initiator to be used, for example, azo compounds such as 2,2'-azobis(isobutyronitrile), 2,2'-azobis (2,4-dimethylvaleronitrile), and 2,2'-azobis(4-methoxy-2,4-dimethylvaleronitrile) are preferable. A proportion of the polymerization initiator used is preferably 0.01 to 30 parts by mass with respect to 100 parts by mass of all monomers used in the reaction. The above-described polymerization reaction is preferably carried out in an organic solvent. Examples of organic solvents used in the reaction include alcohols, ethers, ketones, amides, esters, hydrocarbon compounds, and the like. A reaction temperature is preferably 30° C. to 120° C. A reaction time is preferably 1 to 36 hours. An amount (a) of organic solvent used is preferably an amount such that a total amount (b) of a monomer to be used in the reaction becomes 0.1 to 60% by mass with respect to a total amount (a+b) of a reaction solution.

The reaction solution obtained by dissolving the polymer [P1] is preferably provided for the preparation of the liquid crystal alignment agent, after isolating the polymer [P1] contained in the reaction solution by using a known isolation method such as a method for drying a precipitate obtained by pouring a reaction solution into a large amount of a poor solvent under reduced pressure, and a method for distilling off a reaction solution under reduced pressure with an evaporator.

A weight-average molecular weight (Mw) in terms of polystyrene which is measured by gel permeation chromatography (GPC) of the polymer [P1] is preferably 1,000 to 300,000 and is more preferably 2,000 to 100,000. A molecular weight distribution (Mw/Mn) representing a ratio of Mw to a number average molecular weight (Mn) in terms of polystyrene which is measured by GPC is preferably 10 or less and is more preferably 8 or less. Regarding the polymer [P] used for preparing the liquid crystal alignment agent, one kind may be used alone or two or more kinds thereof may be used in combination.

A content of the polymer [P] in the liquid crystal alignment agent is preferably 0.1% by mass or more, is more preferably 0.5% by mass or more, and is even more preferably 1% by mass or more with respect to all polymers contained in the liquid crystal alignment agent, from the viewpoint of making solvent resistance, liquid crystal alignment properties, and voltage holding ratio of a coated film to be formed favorable. In addition, an upper limit of a content of the polymer [P] is not particularly limited, but is preferably 90% by mass or less, is more preferably 70% by mass or less, and is even more preferably 50% by mass or less with respect to all polymers contained in the liquid crystal alignment agent, in a case of aiming for improvement in electrical characteristics and a reduction in costs by blending in a polymer different from the polymer [P] (hereinafter referred to as "polymer [Q]").

In a manufacturing process of the liquid crystal element, a substrate may be left to stand (post-exposed) as it is in some cases after formation of a liquid crystal alignment film due to mechanical problems, tact adjustment, and the like. In this case, moisture in the air or volatilized solvent may be adsorbed to or absorbed by the liquid crystal alignment film, thereby affecting characteristics of the liquid crystal element in some cases. In this regard, even when a substrate on which the liquid crystal alignment film is formed is left to stand in the manufacturing process of the liquid crystal element, the liquid crystal alignment agent containing the polymer [P] is preferable because adverse effects on various characteristics of the liquid crystal element are few and placing resistance is favorable.

<Other Components>

The liquid crystal alignment agent of the present disclosure contains the polymer [P] as described above, but may contain other components shown below, if necessary.

(Polymer [Q])

The liquid crystal alignment agent of the present disclosure preferably contains the polymer [Q] that is different from the polymer [P] for the purpose of improving electrical characteristics, reducing costs, and the like.

A main skeleton of the polymer [Q] is not limited as long as it does not have at least one of the ring structure (A), the functional group (B), and the optically aligning group (C). Examples of the polymer [Q] include a polyamic acid, a polyimide, a polyamic acid ester, a polyamide, a polyorganosiloxane, a polymer having a structural unit derived from a monomer having an unsaturated bond, and the like. A case where the polymer [Q] is used as a polymer having the functional group (B) is preferable because the interaction between the polymer [P] and the polymer [Q] increases, and therefore solvent resistance and liquid crystal alignment properties of a liquid crystal alignment film to be obtained can be improved.

Among them, the polymer [Q] is preferably at least one kind selected from the group consisting of a polyamic acid, a polyamic acid ester, a polyimide, and a polymer having a structural unit derived from a monomer having an unsaturated bond, from the viewpoints of improvement in electrical characteristics, affinity with liquid crystals, mechanical strength, and affinity with the polymer [P]. The polymer [Q] is particularly preferably at least one kind selected from the group consisting of a polyamic acid, a polyamic acid ester, and a polyimide, from the viewpoint that effects of improving voltage holding ratio are substantial.

A blending proportion of the polymer [Q] is preferably 100 parts by mass or more, is more preferably 100 to 2000 parts by mass, and is even more preferably 200 to 1500 parts by mass with respect to 100 parts by mass of the polymer [P] used for preparation of the liquid crystal alignment agent, from the viewpoint of the effects of blending in the polymer [Q] and effects of blending in the polymer [P] being favorably exhibited in a well-balanced manner.

(Polyamic Acid, Polyamic Acid Ester, and Polyimide)

A polyamic acid, a polyamic acid ester, and a polyimide contained in the liquid crystal alignment agent can be synthesized according to known methods of the related art. For example, a polyamic acid can be obtained by reacting a tetracarboxylic dianhydride with a diamine. A polyamic acid ester can be obtained by, for example, a method for reacting the polyamic acid obtained above with an esterifying agent (for example, methanol, ethanol, N,N-dimethylformamide diethyl acetal, or the like), or the like. A polyimide can be obtained by, for example, dehydration-cyclizing the polyamic acid obtained above so as to be imidized. An imidization ratio of the polyimide is preferably 20 to 95% and is more preferably 30 to 90%. This imidization ratio is expressed as a percentage which is a ratio of the number of imide ring structures to a sum of the number of amic acid structures of polyimide and the number of imide ring structures.

A tetracarboxylic dianhydride used for polymerization is not particularly limited, and various tetracarboxylic dianhydrides can be used. Specific examples thereof include aliphatic tetracarboxylic dianhydrides such as butanetetracarboxylic dianhydride and ethylenediaminetetraacetic dianhydride; alicyclic tetracarboxylic dianhydrides such as 1,2,3,4-cyclobutanetetracarboxylic dianhydride, 1,3-dimethyl-1,2,3,4-cyclobutanetetracarboxylic dianhydride, 2,3,5-tricarboxycyclopentyl acetic dianhydride, 5-(2,5-dioxotetrahydrofuran-3-yl)-3a,4,5,9b-tetrahydronaphtho[1,2-c]furan-1,3-dione, 5-(2,5-dioxotetrahydrofuran-3-yl)-8-methyl-3a,4,5,9b-tetrahydronaphtho[1,2-c]furan-1,3-dione, 2,4,6,8-tetracarboxybicyclo[3.3.0]octane-2:4,6:8-dianhydride, cyclopentane tetracarboxylic dianhydride, and cyclohexane tetracarboxylic dianhydride; aromatic tetracarboxylic dianhydrides such as pyromellitic dianhydride, 4,4'-(hexafluoroisopropylidene)diphthalic anhydride, p-phenylenebis(trimellitic acid monoester anhydride), ethylene glycol bis(anhydrotrimellitate), and 1,3-propylene glycol bis(anhydrotrimellitate); and the like. In addition, a tetracarboxylic dianhydride disclosed in Japanese Unexamined Patent Application, First Publication No. 2010-97188 can be used. Regarding these tetracarboxylic dianhydrides, one kind may be used alone, or two or more kinds thereof may be used in combination.

Tetracarboxylic dianhydrides used for polymerization preferably include an alicyclic tetracarboxylic dianhydride, and more preferably include a tetracarboxylic dianhydride having a cyclobutane ring, a cyclopentane ring, or a cyclohexane ring. A proportion of an alicyclic tetracarboxylic dianhydride used is preferably 5 mol % or more, is more preferably 10 mol % or more, and is even more preferably 20 mol % or more with respect to a total amount of tetracarboxylic dianhydrides used for polymerization.

In addition, examples of diamines used for the above-described polymerization include aliphatic diamines such as ethylenediamine and tetramethylenediamine; alicyclic diamines such as p-cyclohexanediamine and 4,4'-methylenebis(cyclohexylamine); side-chain-type aromatic diamines such as hexadecanoxy diaminobenzene, cholestanyloxy diaminobenzene, cholestanyl diaminobenzoate, cholesteryl diaminobenzoate, lanostanyl diaminobenzoate, 3,6-bis(4-aminobenzoyloxy)cholestane, 3,6-bis(4-aminophenoxy)cholestane, 1,1-bis(4-((aminophenyl)methyl)phenyl)-4-butylcyclohexane, 2,5-diamino-N,N-diallylaniline, and compounds represented by each of Formulas (2-1) to (2-3):

[Chem. 8]

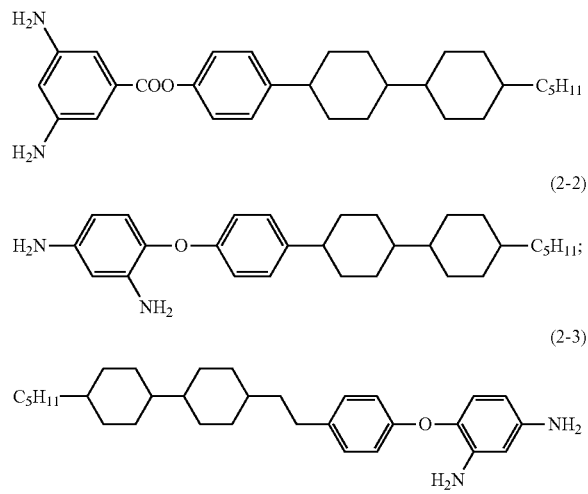

non-side-chain-type aromatic diamines such as p-phenylenediamine, 4,4'-diaminodiphenylmethane, 4,4'-diaminodiphenylamine, 4-aminophenyl-4'-aminobenzoate, 4,4'-diaminoazobenzene, 3,5-diaminobenzoic acid, 1,5-bis(4-aminophenoxy)pentane, bis[2-(4-aminophenyl)ethyl]hexanedioic acid, bis(4-aminophenyl)amine, N,N-bis(4-aminophenyl)methylamine, N,N'-bis(4-aminophenyl)-benzidine, 2,2'-dimethyl-4,4'-diaminobiphenyl, 2,2'-bis(trifluoromethyl)-4,4'-diaminobiphenyl, 4,4'-diaminodiphenyl ether, 2,2-bis[4-(4-aminophenoxy)phenyl]propane, 4,4'-(phenylene diisopropylidene) bisaniline, 1,4-bis(4-aminophenoxy)benzene, 4-(4-aminophenoxycarbonyl)-1-(4-aminophenyl)piperidine, and 4,4'-[4,4'-propane-1,3-diylbis(piperidine-1,4-diye]dianiline; diaminoorganosiloxanes such as 1,3-bis(3-aminopropyl)-tetramethyldisiloxane; and the like. Diamines disclosed in Japanese Unexamined Patent Application, First Publication No. 2010-97188 can be used. Regarding these diamines, one kind may be used alone, or two or more kinds thereof may be used in combination.

A weight-average molecular weight (Mw) in terms of polystyrene measured by GPC for a polyamic acid, a polyamic acid ester, and a polyimide contained in the liquid crystal alignment agent is preferably 1,000 to 500,000 and is more preferably 2,000 to 300,000. A molecular weight distribution (Mw/Mn) is preferably 7 or less and is more preferably 5 or less. Regarding these polyamic acids, polyamic acid esters, and polyimides contained in the liquid crystal alignment agent, one kind may be used alone or two or more kinds thereof may be used in combination.

(Polymer Having Structural Unit Derived from Monomer Having Unsaturated Bond)

A polymer having a structural unit derived from a monomer having an unsaturated bond as the polymer [Q] is different from the polymer [P1] in that the polymer does not have at least one of the ring structure (A), the functional group (B), and the optically aligning group (C). The polymer [Q] can be obtained according to the same method as that of the polymer [P1].

In addition to the above-mentioned components, examples of other components include low-molecular-weight compounds having at least one epoxy group in the molecule and having a molecular weight of 1000 or less (for example, ethylene glycol diglycidyl ether, N,N,N',N'-tetraglycidyl-m-xylenediamine, N,N,N',N'-tetraglycidyl-4,4'-diaminodiphenylmethane, and the like), functional silane compounds, polyfunctional (meth)acrylate, antioxidants, metal chelate compounds, curing accelerators, surfactants, fillers, dispersants, photosensitizers, and the like. A blending proportion of other components can be appropriately selected according to each compound within a range in which the effects of the present disclosure are not impaired.

(Solvent)

The liquid crystal alignment agent of the present disclosure is prepared as a solution-state composition in which polymer components and other components optionally blended in as necessary are preferably dissolved in an organic solvent. Examples of organic solvents to be used include N-methyl-2-pyrrolidone, N-ethyl-2-pyrrolidone, 1,2-dimethyl-2-imidazolidinone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol-n-propyl ether, ethylene glycol-i-propyl ether, ethylene glycol-n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, diisobutyl ketone, isoamyl propionate, isoamyl isobutyrate, diisopentyl ether, ethylene carbonate, propylene carbonate, and the like. Regarding these solvents, one may be used alone or two or more kinds thereof may be used in combination.

A concentration of solid contents in the liquid crystal alignment agent (a proportion of a total mass of components other than the solvent of the liquid crystal alignment agent, which accounts for a total mass of the liquid crystal alignment agent) is appropriately selected in consideration of viscosity, volatility, and the like, but is preferably within a range of 1 to 10% by mass. When a concentration of solid contents is less than 1% by mass, a film thickness of a coated film becomes too thin, and therefore a favorable liquid crystal alignment film becomes difficult to obtain. On the other hand, when a concentration of solid contents exceeds 10% by mass, a film thickness of a coated film becomes too thick, and therefore a favorable liquid crystal alignment film becomes difficult to obtain; or a viscosity of the liquid crystal alignment agent is high, and thus application characteristics tend to be poor.

<<Liquid Crystal Alignment Film and Liquid Crystal Element>>

The liquid crystal alignment film of the present disclosure is formed using the liquid crystal alignment agent prepared as described above. In addition, the liquid crystal element of the present disclosure includes the liquid crystal alignment film formed using the liquid crystal alignment agent described above. An operation mode of liquid crystals in the liquid crystal element is not particularly limited. For example, it is possible to adopt various modes such as a TN type, a STN type, a VA type (including VA-MVA type, VA-PVA type, and the like), an In-Plane Switching (IPS) type, a Fringe Field Switching (FFS) type, an Optically Compensated Bend (OCB) type, and a Polymer Sustained Alignment (PSA) type. The liquid crystal element can be manufactured by, for example, a method including the following Steps 1 to 3. In Step 1, a substrate to be used differs according to a desired operation mode. Each operation mode in Step 2 and Step 3 is common.

<Step 1: Formation of Coated Film>

First, a liquid crystal alignment agent is applied to a substrate, an applied surface is preferably heated, and therefore a coated film is formed on the substrate. As a substrate, it is possible to use a glass such as float glass and soda glass; and a transparent substrate made of a plastic such as polyethylene terephthalate, polybutylene terephthalate, polyethersulfone, polycarbonate, and poly(alicyclic olefin). As a transparent conductive film provided on one surface of the substrate, it is possible to use a NESA membrane (registered trademark of PPG, USA) made of tin oxide ($SnO_2$), an ITO film made of indium tin oxide (($In_2O_3$—$SnO_2$), and the like. In a case of manufacturing a liquid crystal element of a TN type, STN type, or VA type, two substrates having a patterned transparent conductive film are used. Meanwhile, in a case of manufacturing a liquid crystal element of an IPS type or FFS type, a substrate having electrodes patterned in a comb shape and a counter substrate not having electrodes are used. Application of the liquid crystal alignment agent to the substrate is preferably carried out on an electrode-forming surface preferably by an offset printing method, a flexo printing method, a spin coating method, a roll coater method, or an ink jet printing method.

After applying the liquid crystal alignment agent, preliminary heating (pre-baking) is preferably performed for the purpose of preventing dripping of the applied liquid crystal alignment agent. A pre-baking temperature is preferably 30 to 200° C. A prebaking time is preferably 0.25 to 10 minutes. Thereafter, a solvent is completely removed, and as necessary, a burning (post-baking) step is carried out for the purpose of thermally imidizing an amic acid structure present in a polymer. A burning temperature (post-baking temperature) at this time is preferably 80 to 300° C. A post-baking time is preferably 5 to 200 minutes. A film thickness of a film thus formed is preferably 0.001 to 1 µm.

<Step 2: Alignment Treatment>

In a case of manufacturing a liquid crystal element of a TN type, STN type, IPS type, or FFS type, a treatment (alignment treatment) for imparting a liquid crystal alignment capacity to the coated film formed in Step 1 described above is carried out. Accordingly, an alignment capacity for liquid crystal molecules is imparted to the coated film, and therefore a liquid crystal alignment film is formed. Examples of alignment treatments include a rubbing treatment for imparting a liquid crystal alignment capacity to a coated film by rubbing the coated film in a certain direction with a roll wrapped with a cloth made of fibers such as nylon, rayon, and cotton; an optical alignment treatment for imparting a liquid crystal alignment capacity to a coated film formed on a substrate by irradiating the coated film with light; and the like. Among them, an optical alignment treatment is preferable. Meanwhile, in a case of manufacturing a vertically aligned liquid crystal element, the coated film formed in Step 1 described above can be used as it is as a liquid crystal alignment film; however, the coated film may be subjected to an alignment treatment in order to further improving a liquid crystal alignment capacity.

Light irradiation for optical alignment can be carried out by a method for irradiating a coated film after a post-baking step, a method for irradiating a coated film after a pre-baking step before a post-baking step, a method for irradiating a coated film during heating the coated film in at least one of a pre-baking step and a post-baking step, and the like. As a radiation with which a coated film is irradiated, it is possible to use, for example, ultraviolet rays and visible rays having light with a wavelength of 150 to 800 nm. Radiation is preferably ultraviolet rays including light with a wavelength of 200 to 400 nm. When radiation is polarized light, the light may be linearly polarized light or partially polarized light. When the radiation used is linearly polarized light or partially polarized light, irradiation may be performed in a direction perpendicular to a substrate surface, may be performed in an oblique direction, or may be performed in a combination thereof. An irradiation direction in a case of non-polarized radiation is an oblique direction.

Examples of light sources to be used include a low pressure mercury lamp, a high pressure mercury lamp, a deuterium lamp, a metal halide lamp, an argon resonance lamp, a xenon lamp, an excimer laser, and the like. An irradiation level of radiation is preferably 400 to 50,000 $J/m^2$ and is more preferably 1,000 to 20,000 $J/m^2$. After light irradiation for imparting an alignment capacity, a substrate surface may be subjected to, for example, a treatment of washing with water, an organic solvent (for example, methanol, isopropyl alcohol, 1-methoxy-2-propanol acetate, butyl cellosolve, ethyl lactate, and the like), or a mixture thereof; or may be subjected a treatment of heating the substrate.

<Step 3: Construction of Liquid Crystal Cell>

Two substrates on which the liquid crystal alignment film is formed as described above are prepared, and a liquid crystal is disposed between the two substrates disposed to face each other. Therefore a liquid crystal cell is manufactured. Examples of methods for manufacturing the liquid crystal cell include a method in which two substrates are disposed to face each other with a gap therebetween so that the liquid crystal alignment films face each other, peripheral portions of the two substrates are bonded together with a sealing agent, a liquid crystal is injected to fill a cell gap surrounded by the sealing agent and a substrate surface, and therefore an injection hole is sealed; a method using an ODF system; and the like. As the sealing agent, for example, an epoxy resin containing a curing agent and aluminum oxide spheres as a spacer, and the like can be used. Examples of liquid crystals include a nematic liquid crystal and a smectic liquid crystal. Among them, a nematic liquid crystal is preferable. In a PSA mode, in a state where a voltage is applied between conductive films that a pair of substrates has, the liquid crystal cell is subjected to a light irradiation after the liquid crystal cell is constructed.

Subsequently, if necessary, a polarizer is attached to an outer surface of the liquid crystal cell to form a liquid crystal element. Examples of polarizers include a polarizer in which a polarizing film called an "H film" which has absorbed iodine while stretch-aligning a polyvinyl alcohol is sandwiched between cellulose acetate protective films, or a polarizer formed of an H film itself.

The liquid crystal element of the present disclosure can be effectively applied in various uses, and can be used in various display apparatus such as watches, portable games, word processors, notebook PCs, car navigation systems, camcorders, PDAs, digital cameras, mobile phones, smartphones, various monitors, liquid crystal televisions, and information displays; light-dimming films; and the like. In addition, the liquid crystal element formed using the liquid crystal alignment agent of the present disclosure can also be applied to a phase difference film.

EXAMPLES

Hereinafter, the present disclosure will be more specifically explained based on examples, but the contents thereof are not limited to these examples.

In the present example, a weight-average molecular weight (Mw), a number average molecular weight (Mn), and a molecular weight distribution (Mw/Mn) of a polymer were measured by the following method.

<Weight-Average Molecular Weight, Number Average Molecular Weight, and Molecular Weight Distribution>

Mw and Mn were measured by gel permeation chromatography (GPC) under the following conditions. In addition, a molecular weight distribution (Mw/Mn) was calculated from the obtained Mw and Mn.

Apparatus: "GPC-101" of Showa Denko K. K.

GPC column: a combination of "GPC-KF-801," "GPC-KF-802," "GPC-KF-803," and "GPC-KF-804" manufactured by Shimadzu GLC Ltd.

Mobile phase: tetrahydrofuran (THF)

Column temperature: 40° C.

Flow rate: 1.0 mL/min

Sample concentration: 1.0% by mass

Sample injection volume: 100 μL

Detector: differential refractometer

Standard substance: monodispersed polystyrene

Compounds used in the following synthesis examples are shown below. In the following description, a "compound represented by Formula (X)" may be simply referred to as a "compound (X)" for convenience in some cases.

[Chem. 9]

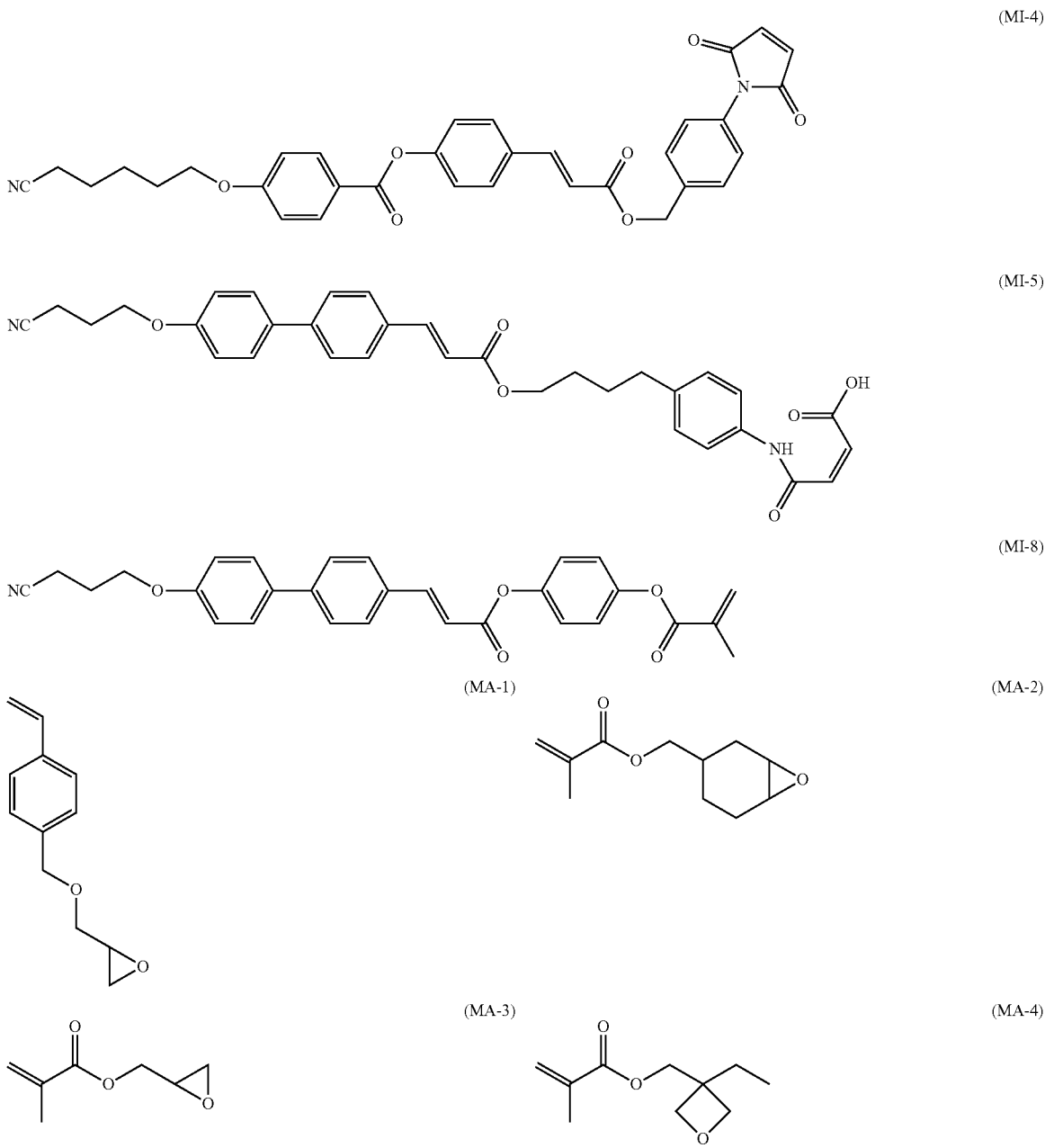

[Chem. 10]
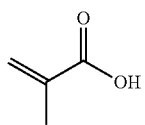 (MA-1)
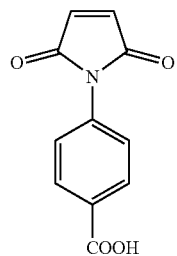 (MA-2)
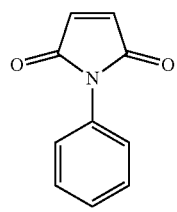 (MA-3)
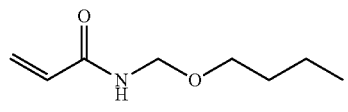 (MA-4)
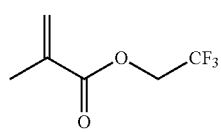 (MA-5)
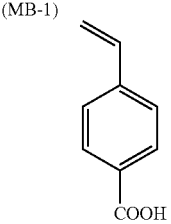 (MB-1)
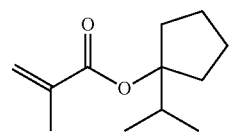 (MB-2)
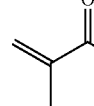 (MB-3)
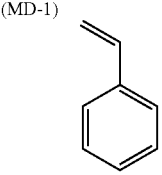 (MD-1)
(MD-2)
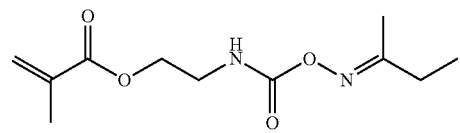 (MD-3)
 (MD-4)
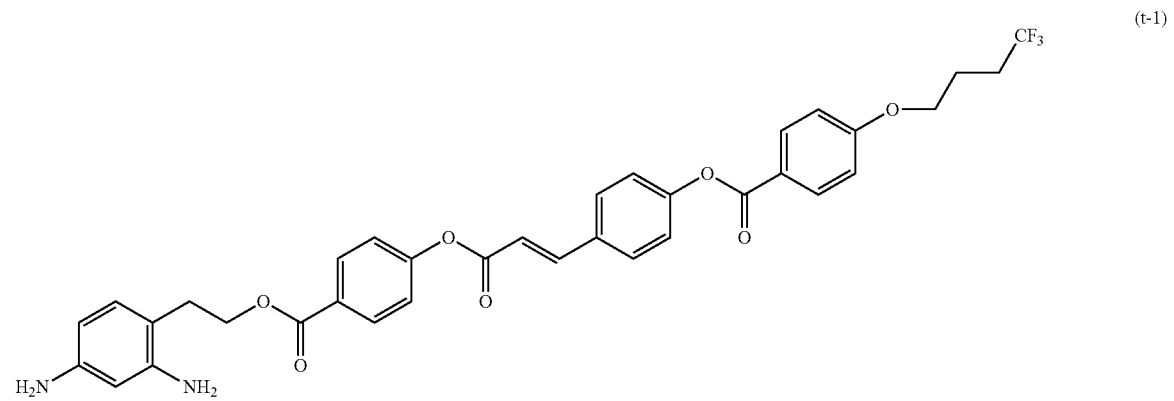 [SMILES: Nc1ccc(CCOC(=O)c2ccc(OC(=O)/C=C/c3ccc(OC(=O)c4ccc(OCCCC(F)(F)F)cc4)cc3)cc2)c(N)c1] (t-1)

<Synthesis of Nonomers>
[Synthesis Example 1-1]
A compound (MI-1) was synthesized according to Scheme 1 below.

Scheme 1

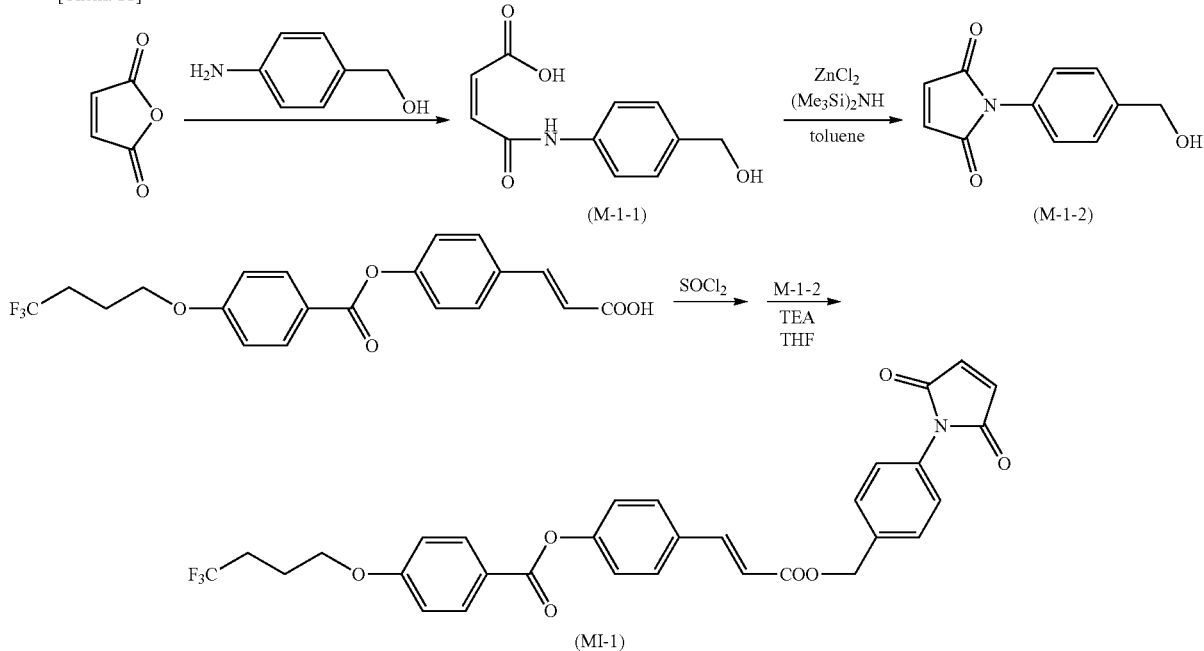

Synthesis of Compound (M-1-1)

12.3 g of (4-aminophenyl)methanol was added to a 2000 mL three-necked flask equipped with a stirrer, 200 g of tetrahydrofuran was added thereto, and the mixture was cooled in an ice-bath. A solution composed of 9.81 g of succinic anhydride and 200 g of tetrahydrofuran was added dropwise thereinto, and the reaction solution was stirred at room temperature for 3 hours. Thereafter, a precipitated yellow solid was collected with filtration. This yellow solid was vacuum dried, and therefore 21.0 g of a compound (M-1-1) was obtained.

Synthesis of Compound (M-1-2)

17.7 g of the compound (M-1-1), 10.9 g of zinc(II) chloride, and 250 g of toluene were added to a 500 mL three-necked flask equipped with a stirrer, and the mixture was heated and stirred at 80° C. A solution composed of 23.2 g of bis(trimethylsilyl) amine and 100 g of toluene was added dropwise thereinto, and the reaction solution was stirred at 80° C. for 5 hours. Thereafter, 300 g of ethyl acetate was added into the reaction solution, and the solution was washed with 1 mol/L hydrochloric acid twice, with an aqueous solutions of sodium hydrogen carbonate once, and with saturated saline once. Thereafter, an organic layer was gradually concentrated using a rotary evaporator until an amount of contents reached 50 g. A white solid precipitated during the concentration was collected with filtration. This white solid was vacuum dried, and therefore 8.13 g of a compound (M-1-2) was obtained.

Synthesis of Compound (MI-1)

11.8 g of (E)-3-(4-((4-(4,4,4-trifluorobutoxy)benzoyeoxy)phenyeacrylic acid, 20 g of thionyl chloride, and 0.01 g of N,N-dimethylformamide were added to a 100 mL eggplant flask equipped with a stirrer, and the mixture was stirred at 80° C. for 1 hour. Thereafter, excess thionyl chloride was removed with a diaphragm pump, and 100 g of tetrahydrofuran was added thereinto. The reaction solution was used as a solution A.

6.09 g of the compound (M-1-2), 200 g of tetrahydrofuran, and 12.1 g of triethylamine were added to a 500 mL three-necked flask equipped with a stirrer, and the mixture was cooled in an ice-bath. The solution A was added dropwise thereinto, and the reaction solution was stirred at room temperature for 3 hours. The reaction solution was reprecipitated with 800 mL of water. The obtained white solid was vacuum dried, and therefore 13.7 g of a compound (MI-1) was obtained.

[Synthesis Example 1-2]
A compound (MI-2) was synthesized according to Scheme 2 below.

Scheme 2

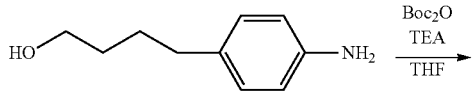

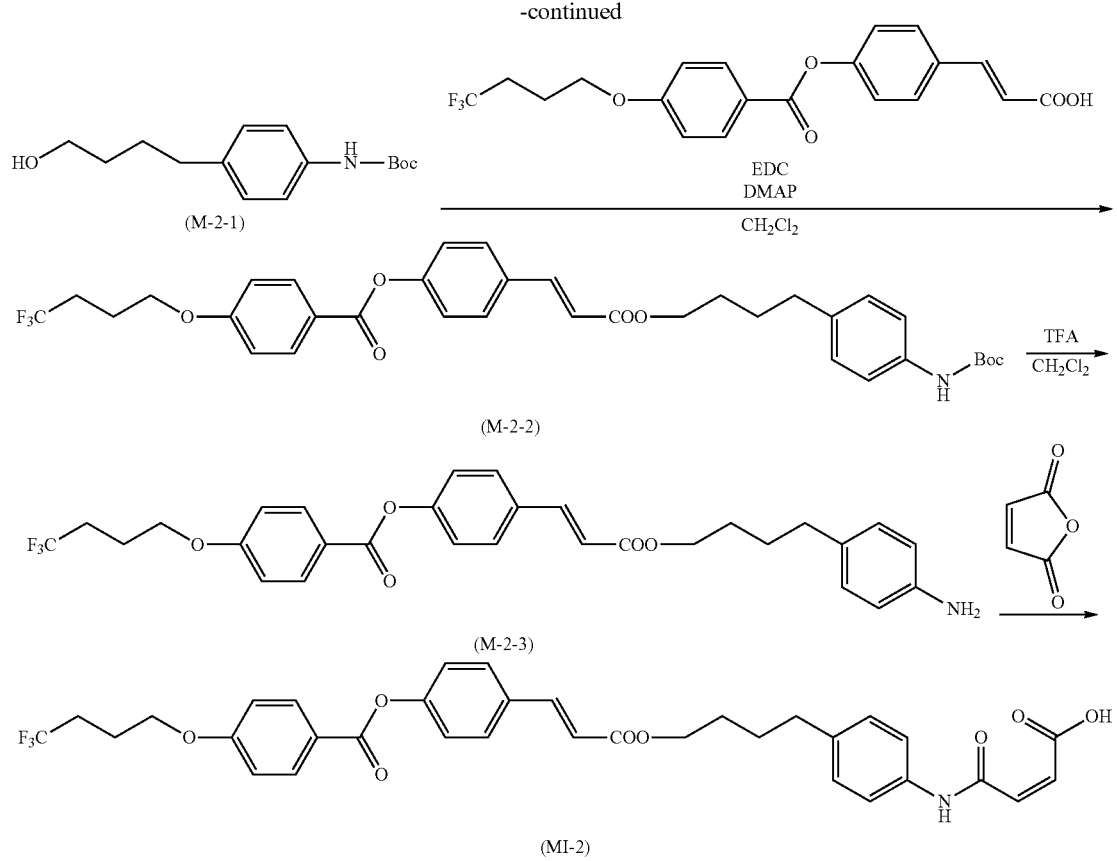

Synthesis of compound (M-2-1)

16.5 g of 4-(4-aminophenyl)butan-1-ol and 1000 g of tetrahydrofuran were added to a 2000 mL three-necked flask equipped with a stirrer. 15.1 g of triethylamine was added thereinto, and the mixture was cooled in an ice-bath. A solution composed of 24.0 g of t-butyl Bicarbonate and 100 g of tetrahydrofuran was added dropwise thereinto, and stirred at room temperature for 10 hours. Thereafter, 300 g of ethyl acetate was added to the reaction solution, and the solution was washed four times with 200 g of distilled water. Thereafter, an organic layer was gradually concentrated using a rotary evaporator until an amount of contents reached 100 g. A white solid precipitated during the concentration was collected with filtration. This white solid was vacuum dried, and therefore 25.2 g of a compound (M-2-1) was obtained.

Synthesis of Compound (M-2-2)

21.2 g of the compound (M-2-1) and 31.5 g of (E)-3-(4-((4-(4,4,4-trifluorobutoxy)benzoyeoxy)phenyeacrylic acid were added to a 2000 mL three-necked flask equipped with a stirrer. 1000 g of dichloromethane was added thereinto, and the mixture was cooled in an ice-bath. 1.95 g of N,N-dimethylaminopyridine and 23.0 g of 1-ethyl-3-(3-dimethylaminopropyl) carbodiimide hydrochloride were added thereinto in this order, and stirred at room temperature for 8 hours. Thereafter, the solution was washed four times with 500 g of distilled water. Thereafter, an organic layer was gradually concentrated using a rotary evaporator until an amount of contents reached 100 g. A white solid precipitated during the concentration was collected with filtration. This white solid was vacuum dried, and therefore 33.2 g of a compound (M-2-2) was obtained.

Synthesis of Compound (M-2-3)

27.3 g of the compound (M-2-2) and 28.5 g of trifluoroacetic acid were added to a 300 mL eggplant flask equipped with a stirrer. 50 g of dichloromethane was added thereinto, and the mixture was stirred at room temperature for 1 hour. Thereafter, the stirred mixture was neutralized with a saturated aqueous solution of sodium hydrogen carbonate, and then the solution was washed four times with 50 g of distilled water. Thereafter, an organic layer was gradually concentrated using a rotary evaporator until an amount of contents reached 50 g. A white solid precipitated during the concentration was collected with filtration. This white solid was vacuum dried, and therefore 26.5 g of a compound (M-2-3) was obtained.

Synthesis of Compound (MI-2)

Using the compound (M-2-3) as a starting material, a compound (MI-2) was obtained by the same synthesis formula as that of the compound (M-1-1).

[Synthesis Example 1-3]

A compound (MI-3) was synthesized according to Scheme 3 below.

Scheme 3

[Chem. 13]

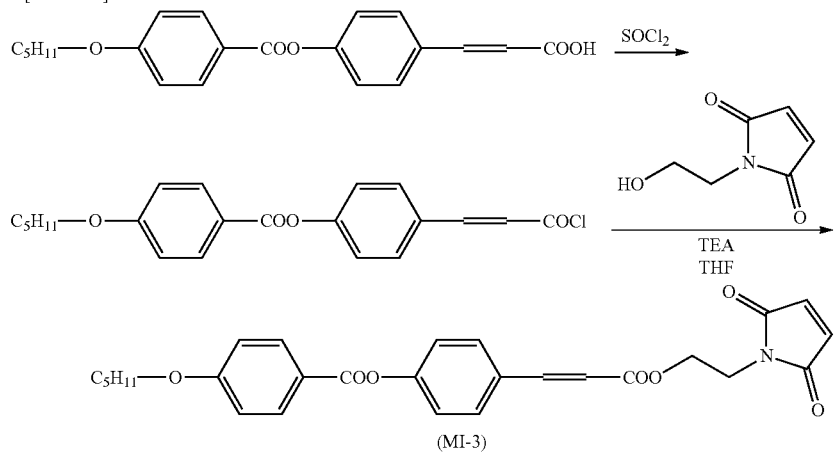

Synthesis of Compound (MI-3)

Using 3-(4-((4-(pentyloxy)benzoyl)oxy)phenyl) acrylic acid and 1-(2-hydroxyethyl)-1H-pyrrole-2,5-dione as starting materials, a compound (MI-3) was obtained by the same synthesis formula as that of the compound (MI-1).

[Synthesis Example 1-4]

A compound (MI-6) was synthesized according to Scheme 4 below.

Scheme 4

[Chem. 14]

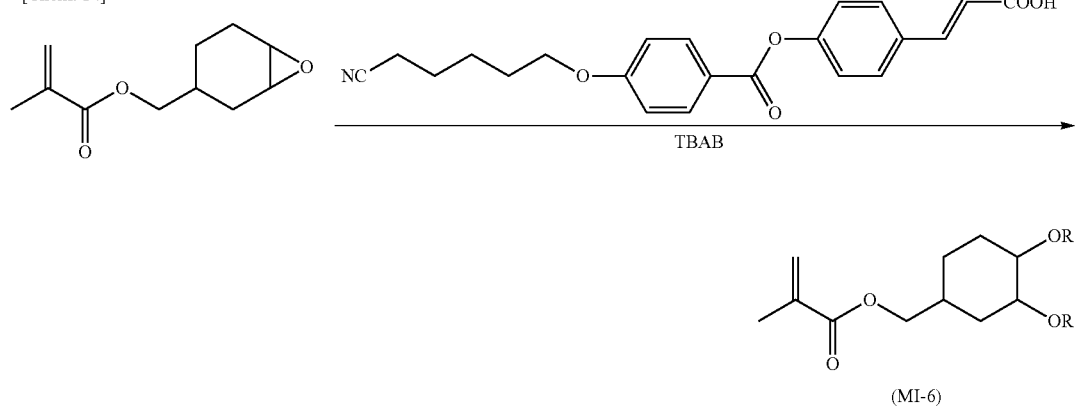

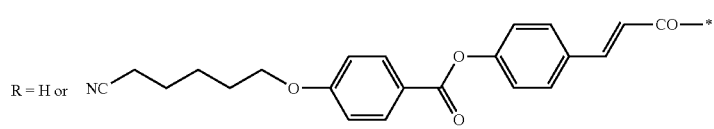

Synthesis of Compound (MI-6)

9.81 g of 7-oxabicyclo[4.1.0]heptan-3-ylmethyl methacrylate, 19.0 g of (E)-3-(4-((4-((5-cyanopentyl)oxy)benzoyl)oxy)phenyl) acrylic acid, and 500 g of N-methylpyrrolidone were added to a 1000 mL eggplant flask equipped with a stirrer. 1.61 g of tetrabutylammonium bromide was added thereinto, and the mixture was stirred at 110° C. for 3 hours. Thereafter, 300 g of cyclohexane and 400 g of cyclopentanone were added into the reaction solution, and the solution was washed five times with 400 g of distilled water. Thereafter, an organic layer was gradually concentrated using a rotary evaporator until an amount of contents reached 50 g. A white solid precipitated during the concentration was collected with filtration. This white solid was vacuum dried, and therefore 23.0 g of a compound (MI-6) was obtained.

[Synthesis Example 1-5]

A compound (MI-7) was synthesized according to Scheme 5 below.

Scheme 5

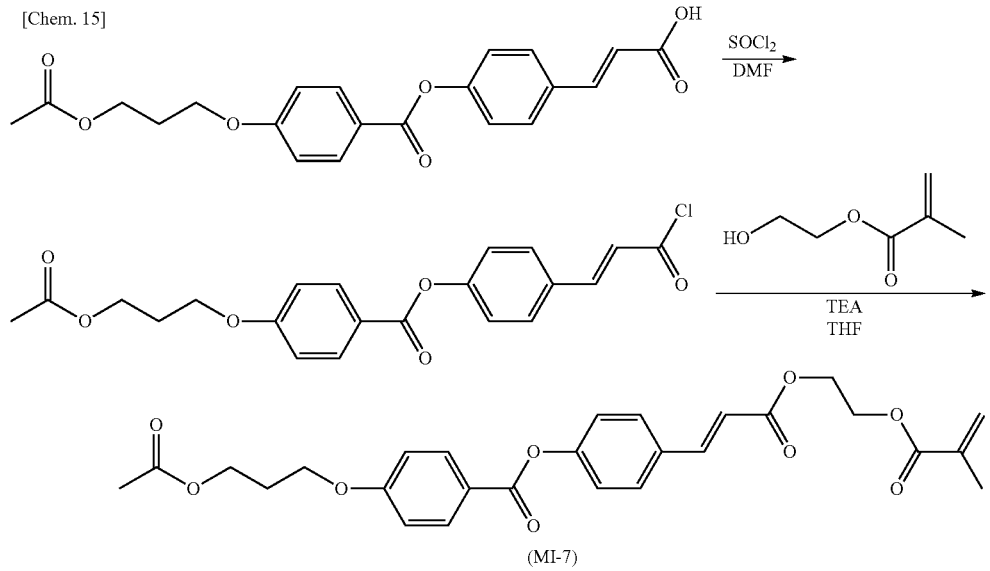

(MI-7)

Synthesis of Compound (MI-7)

Using (E)-3-(4-((4-(3-acetoxypropoxy)benzoyl)oxy)phenyl) acrylic acid and 2-hydroxyethyl methacrylate as starting materials, a compound (MI-7) was obtained by the same synthesis formula as that of the compound (MI-1).

<Synthesis of Polymer>

[Synthesis Example 2-1]

5.00 g (8.6 mmol) of the compound (MI-1) obtained in Synthesis Example 1-1, 3.39 g (17.3 mmol) of 3,4-epoxycyclohexylmethyl methacrylate, 0.74 g (8.6 mmol) of methacrylic acid, and 1.28 g (8.6 mmol) of 4-vinylbenzoic acid as polymerization monomers; 0.31 g (1.3 mmol) of 2,2'-azobis(2,4-dimethylvaleronitrile) as a radical polymerization initiator; 0.52 g (2.2 mmol) of 2,4-diphenyl-4-methyl-1-pentene as a chain transfer agent; and 25 ml of tetrahydrofuran as a solvent were added to a 100 mL two-necked flask under nitrogen. Polymerization was carried out at 70° C. for 5 hours. After reprecipitation with n-hexane, the precipitate was filtered and vacuum dried at room temperature for 8 hours. Therefore, a target polymer (P-1) was obtained. A weight-average molecular weight Mw was 30000, and a molecular weight distribution Mw/Mn was 3, both measured by GPC in terms of polystyrene.

[Synthesis Examples 2-2 to 2-21]

The synthesis was carried out in the same manner as in Synthesis Example 2-1 except that the type and molar ratio of polymerization monomers were changed as shown in Tables 1 and 2. Therefore, each polymer of polymers (P-2) to (P-21) having a weight-average molecular weight and a molecular weight distribution equivalent to those of the polymer (P-1) was obtained. A total number of moles of the polymerization monomer was 43.1 mmol, which was the same number as that of Synthesis Example 2-1. Numerical values in Tables 1 and 2 represent an amount [mol %] of each monomer charged with respect to all monomers used for the synthesis of the polymer.

[Comparative Synthesis Examples 1 to 5]

A polymerization monomer was added to a 100 mL two-necked flask under nitrogen using the type and molar ratio thereof shown in Table 2 such that a total number of moles of the polymerization monomer became 43.1 mmol. 0.31 g (1.3 mmol) of 2,2'-azobis(2,4-dimethylvaleronitrile) as a radical polymerization initiator, 0.52 g (2.2 mmol) of 2,4-diphenyl-4-methyl-1-pentene as a chain transfer agent, and 25 ml of tetrahydrofuran as a solvent were added thereinto, and polymerization was carried out at 70° C. for 5 hours. After reprecipitation with n-hexane, the precipitate was filtered and vacuum dried at room temperature for 8 hours. Therefore, each of polymers (C-1) to (C-5) having a weight-average molecular weight and a molecular weight distribution equivalent to those of the polymer (P-1) was obtained.

TABLE 1

| | Polymer name | Ring structure-containing monomer | | | | Functional group-containing monomer | | | | Optically aligning group-containing monomer | | |
|---|---|---|---|---|---|---|---|---|---|---|---|---|
| | | MA-1 | MA-2 | MA-3 | MA-4 | MB-1 | MB-2 | MB-3 | MB-4 | MI-1 | MI-2 | MI-3 |
| Synthesis Example 2-1 | P-1 | — | 40 | — | — | 20 | 20 | — | — | 20 | — | — |
| Synthesis Example 2-2 | P-2 | 40 | — | — | — | — | 10 | 30 | — | 20 | — | — |
| Synthesis Example 2-3 | P-3 | 40 | — | — | — | — | — | — | 40 | 20 | — | — |
| Synthesis Example 2-4 | P-4 | 30 | — | — | — | — | 10 | 20 | — | 20 | — | — |

TABLE 1-continued

| | | | | | | | | | | | |
|---|---|---|---|---|---|---|---|---|---|---|---|
| Synthesis Example 2-5 | P-5 | — | — | 40 | — | 20 | 20 | — | — | 20 | — | — |
| Synthesis Example 2-6 | P-6 | — | — | — | 40 | 20 | 20 | — | — | 20 | — | — |
| Synthesis Example 2-7 | P-7 | 40 | — | — | — | — | 10 | 30 | — | — | 20 | — |
| Synthesis Example 2-8 | P-8 | 40 | — | — | — | — | 10 | 30 | — | — | — | 20 |
| Synthesis Example 2-9 | P-9 | 40 | — | — | — | — | 10 | 30 | — | — | — | — |
| Synthesis Example 2-10 | P-10 | 40 | — | — | — | — | 10 | 30 | — | — | — | — |
| Synthesis Example 2-11 | P-11 | — | 25 | — | — | 25 | — | — | — | — | — | — |
| Synthesis Example 2-12 | P-12 | — | 25 | — | — | — | — | 25 | — | — | — | — |
| Synthesis Example 2-13 | P-13 | 25 | — | — | — | — | 25 | — | — | — | — | — |

| | Optically aligning group-containing monomer | | | | | Other monomers | | | | |
|---|---|---|---|---|---|---|---|---|---|---|
| | MI-4 | MI-5 | MI-6 | MI-7 | MI-8 | MD-1 | MD-2 | MD-3 | MD-4 | MD-5 |
| Synthesis Example 2-1 | — | — | — | — | — | — | — | — | — | — |
| Synthesis Example 2-2 | — | — | — | — | — | — | — | — | — | — |
| Synthesis Example 2-3 | — | — | — | — | — | — | — | — | — | — |
| Synthesis Example 2-4 | — | — | — | — | — | — | 20 | — | — | — |
| Synthesis Example 2-5 | — | — | — | — | — | — | — | — | — | — |
| Synthesis Example 2-6 | — | — | — | — | — | — | — | — | — | — |
| Synthesis Example 2-7 | — | — | — | — | — | — | — | — | — | — |
| Synthesis Example 2-8 | — | — | — | — | — | — | — | — | — | — |
| Synthesis Example 2-9 | 20 | — | — | — | — | — | — | — | — | — |
| Synthesis Example 2-10 | — | 20 | — | — | — | — | — | — | — | — |
| Synthesis Example 2-11 | — | — | 50 | — | — | — | — | — | — | — |
| Synthesis Example 2-12 | — | — | 50 | — | — | — | — | — | — | — |
| Synthesis Example 2-13 | — | — | 50 | — | — | — | — | — | — | — |

TABLE 2

| | Polymer name | Ring structure-containing monomer | | | | Functional group-containing monomer | | | | Optically aligning group-containing monomer | | |
|---|---|---|---|---|---|---|---|---|---|---|---|---|
| | | MA-1 | MA-2 | MA-3 | MA-4 | MB-1 | MB-2 | MB-3 | MB-4 | MI-1 | MI-2 | MI-3 |
| Synthesis Example 2-14 | P-14 | — | 25 | — | — | 25 | — | — | — | — | — | — |
| Synthesis Example 2-15 | P-15 | — | 25 | — | — | 25 | — | — | — | — | — | — |
| Synthesis Example 2-16 | P-16 | 20 | — | — | — | — | 10 | 10 | — | 60 | — | — |
| Synthesis Example 2-17 | P-17 | 40 | — | — | — | — | — | — | 40 | 10 | — | 10 |
| Synthesis Example 2-18 | P-18 | 38 | — | — | — | — | 10 | 28 | — | 4 | — | — |
| Synthesis Example 2-19 | P-19 | 40 | — | — | — | — | 10 | 30 | — | — | — | — |
| Synthesis Example 2-20 | P-20 | — | 15 | — | — | 45 | 20 | — | — | 20 | — | — |
| Synthesis Example 2-21 | P-21 | — | 50 | — | — | 10 | 20 | — | — | 20 | — | — |
| Comparative Synthesis Example 1 | C-1 | — | — | — | — | — | 10 | 30 | — | 20 | — | — |

TABLE 2-continued

| | | | | | | | | | | | |
|---|---|---|---|---|---|---|---|---|---|---|---|
| Comparative Synthesis Example 2 | C-2 | 40 | — | — | — | — | — | — | — | 20 | — | — |
| Comparative Synthesis Example 3 | C-3 | — | — | — | — | — | — | — | — | 20 | — | — |
| Comparative Synthesis Example 4 | C-4 | — | — | — | — | — | — | — | — | 20 | — | — |
| Comparative Synthesis Example 5 | C-5 | 40 | — | — | — | — | — | 10 | 30 | — | — | — |

| | Optically aligning group-containing monomer | | | | | Other monomers | | | | |
|---|---|---|---|---|---|---|---|---|---|---|
| | MI-4 | MI-5 | MI-6 | MI-7 | MI-8 | MD-1 | MD-2 | MD-3 | MD-4 | MD-5 |
| Synthesis Example 2-14 | — | — | — | 50 | — | — | — | — | — | — |
| Synthesis Example 2-15 | — | — | — | — | 50 | — | — | — | — | — |
| Synthesis Example 2-16 | — | — | — | — | — | — | — | — | — | — |
| Synthesis Example 2-17 | — | — | — | — | — | — | — | — | — | — |
| Synthesis Example 2-18 | — | — | — | — | — | — | 20 | — | — | — |
| Synthesis Example 2-19 | 10 | — | — | — | — | — | — | — | — | 10 |
| Synthesis Example 2-20 | — | — | — | — | — | — | — | — | — | — |
| Synthesis Example 2-21 | — | — | — | — | — | — | — | — | — | — |
| Comparative Synthesis Example 1 | — | — | — | — | — | — | 40 | — | — | — |
| Comparative Synthesis Example 2 | — | — | — | — | — | 30 | 10 | — | — | — |
| Comparative Synthesis Example 3 | — | — | — | — | — | 10 | 30 | 40 | — | — |
| Comparative Synthesis Example 4 | — | — | — | — | — | 10 | 30 | — | 40 | — |
| Comparative Synthesis Example 5 | — | — | — | — | — | 20 | — | — | — | — |

[Comparative Synthesis Example 6]

13.8 g (70.0 mmol) of 1,2,3,4-cyclobutanetetracarboxylic acid dianhydride as a tetracarboxylic dianhydride, and 49.9 g (76.9 mmol) of the compound represented by Formula (t-1) as a diamine were dissolved in 170 g of N-methyl-2-pyrrolidone (NMP), and reacted at 25° C. for 3 hours. Therefore, a solution containing 10% by mass of polyamic acid was obtained. Subsequently, the polyamic acid solution was poured into a large excess of methanol to precipitate the reaction product. This precipitate was washed with methanol and dried at 40° C. under reduced pressure for 15 hours. Therefore, a polymer (PAA-1) as a polyamic acid was obtained.

[Synthesis Example 2-22]

13.8 g (70.0 mmol) of 1,2,3,4-cyclobutanetetracarboxylic acid dianhydride as a tetracarboxylic dianhydride, and 16.3 g (76.9 mmol) of 2,2'-dimethyl-4,4'-diaminobiphenyl as a diamine were dissolved in 170 g of NMP, and reacted at 25° C. for 3 hours. Therefore, a solution containing 10% by mass of polyamic acid was obtained. Subsequently, the polyamic acid solution was poured into a large excess of methanol to precipitate the reaction product. This precipitate was washed with methanol and dried at 40° C. under reduced pressure for 15 hours. Therefore, a polyamic acid (PAA-2) was obtained.

<Manufacture and Evaluation of Optical-Vertical-Type Liquid Crystal Display Element>

[Example 1]

1. Preparation of Liquid Crystal Alignment Agent (AL-1)

NMP and butyl cellosolve (BC) as solvents were added to 100 parts by mass of the polymer (P-1) obtained in Synthesis Example 2-1 as the polymer [P] to obtain a solution in which a solvent composition was NMP/BC=50/50 (mass ratio) and a concentration of solid contents was 4.0% by mass. This solution was filtered through a filter having a pore diameter of 1 μm. Therefore, a liquid crystal alignment agent (AL-1) was prepared.

2. Evaluation of Solvent Resistance of Liquid Crystal Alignment Film

After applying the liquid crystal alignment agent (AL-1) on a silicone substrate using a spinner, the substrate was pre-baked on a hot plate at 90° C. for 2 minutes to form a coated film having a film thickness of 1.0 μm. The obtained coated film was heated on a hot plate at 230° C. for 30 minutes. Thereafter, the film was immersed in NMP for 1 minute, and then dried at 100° C. for 5 minutes. A change rate ADnmp of a film thickness before and after immersion was obtained by Numerical Formula (1) to evaluate solvent resistance of the film by the change rate ΔDnmp.

$$\Delta Dnmp = [((\text{film thickness before immersion}) - (\text{film thickness after immersion}))/(\text{film thickness before immersion})] \times 100 \quad (1)$$

In the evaluation, a case where a change rate ΔDnmp was −2% to 2% was evaluated as "good (A)," a case where a change rate ΔDnmp was within a range of −5% or more and less than −2%, or within a range of more than 2% and 5% or less was evaluated as "possible (B)," and a case where a change rate ΔDnmp was more than 5% or less than −5% was evaluated as "poor (C)." In this example, the solvent resistance was evaluated as "B."

3. Manufacture of Optical-Vertical-Type Liquid Crystal Display Element

The liquid crystal alignment agent (AL-1) prepared above was applied with a spinner on a transparent electrode surface of a glass substrate having a transparent electrode, which is made of an ITO film. The substrate was pre-baked on a hot plate at 80° C. for 1 minute. Thereafter, the substrate was heated at 230° C. for 1 hour in an oven in which an inside thereof was purged with nitrogen. Therefore, a coated film having a film thickness of 0.1 μm was formed. Subsequently, a surface of the coated film was irradiated with 1000 J/m² of polarized ultraviolet rays having bright lines of 313 nm by using a Hg-Xe lamp and a Glan-Taylor prism in a direction tilted by 40° from a normal line of the substrate to impart a liquid crystal alignment capacity thereto. By repeating the same operation, a pair of substrates (two sheets) having a liquid crystal alignment film were prepared.

An epoxy resin adhesive containing an aluminum oxide sphere having a diameter of 3.5 μm was applied to an outer periphery of a surface having the liquid crystal alignment film thereon of one sheet of the substrates, by screen printing. Thereafter, surfaces of the liquid crystal alignment films of the pair of the substrates were allowed to face each other to be pressed such that a projection direction of an optical axis of ultraviolet rays on each substrate to the substrate surface became antiparallel. The adhesive was thermally cured at 150° C. for 1 hour. Subsequently, a gap between the substrates was filled with a negative liquid crystal (MLC-6608 manufactured by Merck KGaA) from a liquid crystal injection port. Thereafter, a liquid crystal inlet was sealed with an epoxy adhesive. In addition, the liquid crystal inlet was heated at 130° C. and then gradually cooled to room temperature in order to remove flow alignment at the time of liquid crystal injection. Subsequently, a polarizer was laminated on both outer surfaces of the substrate such that polarization directions thereof became orthogonal to each other, and such that an angle of 45° with respect to the projection direction of the optical axis of ultraviolet rays of the liquid crystal alignment film on the substrate surface is formed. Therefore, a liquid crystal display element was manufactured.

4. Evaluation of Liquid Crystal Alignment Properties

The presence or absence of an abnormal domain during changing of light and dark when a voltage of 5 V was turned ON and OFF (applied/released) with respect to the liquid crystal display element manufactured as described above, was observed with an optical microscope. Liquid crystal alignment properties were evaluated as follows. A case where an abnormal domain was not present was evaluated as "good (A)," a case where an abnormal domain was partially present was evaluated as "possible (B)," and a case where an abnormal domain was totally present was evaluated as "poor (C)." As a result, in this example, the liquid crystal alignment properties were "A."

5. Evaluation of Voltage Holding Ratio (VHR)

A voltage of 5 V was applied to the liquid crystal display element manufactured as above for 60 microseconds in an application time and 167 milliseconds in a time span. Thereafter, a voltage holding ratio after 167 milliseconds from release of application was measured. VHR-1 manufactured by TOYO Corporation was used as a measuring device. At this time, a case where a voltage holding ratio was 95% or more was "excellent (A)," a case where a voltage holding ratio was 80% or more and less than 95% was "good (B)," a case where a voltage holding ratio was 50% or more and less than 80% was "possible (C)," and a case where a voltage holding ratio was less than 50% was "poor (D)." As a result, in this example, the voltage holding ratio was evaluated as "B."

6. Evaluation of Placing Resistance

The liquid crystal alignment agent (AL-1) prepared above was applied with a spinner on a transparent electrode surface of a glass substrate having a transparent electrode, which is made of an ITO film. The substrate was pre-baked on a hot plate at 80° C. for 1 minute. Thereafter, the substrate was heated at 230° C. for 1 hour in an oven in which an inside thereof was purged with nitrogen. Therefore, a coated film having a film thickness of 0.1 μm was formed. Subsequently, a surface of the coated film was irradiated with 1000 J/m² of polarized ultraviolet rays having bright lines of 313 nm by using a Hg-Xe lamp and a Glan-Taylor prism in a direction tilted by 40° from a normal line of the substrate. Therefore, a liquid crystal alignment film was obtained. By repeating the same operation, two sets of a pair of substrates (total 4 sheets) having a liquid crystal alignment film were created.

A pair of substrates (2 sheets) of the substrates created above, and a petri dish containing NMP were put into a stainless steel vat (about 20 cm×30 cm). The stainless steel vat into which the substrate and the petri dish were put was covered with aluminum foil and allowed to stand at 25° C. for 2 hours. Thereafter, the substrate was taken out. Thereafter, using the pair of substrates taken out, a liquid crystal display element (which will be referred to as "element A") was manufactured by the same method as in the above-described "3. Manufacture of optical-vertical-type liquid crystal display element."

In addition, a liquid crystal display element (which will be referred to as "element B") was manufactured by the same operation as above except that a treatment for allowing the petri dish containing NMP and the substrate to stand in the stainless steel vat was not performed on a pair of substrates of the other set.

Subsequently, each of pretilt angles of the two liquid crystal display elements was measured by a crystal rotation method using a He-Ne laser beam according to a method disclosed in Non Patent Literature (T. J. Scheller et. al. J. Appl. Phys. Vo. 19. p. 2013 (1980)). A tilt difference Δθ was obtained by Numerical Formula (2).

$$\Delta\theta = ((\theta 1 - \theta 2)/\theta 1) \times 100 \quad (2)$$

(In Numerical Formula (2), θ1 is a pretilt angle of the element B, and θ2 is a pretilt angle of the element A.)

A case where Δθ was 5% or less was "good (A)," a case where Δθ was more than 5% and less than 10% was "possible (B)," and a case where Δθ was 10% or more was "poor (C)." As a result, in this example, the placing resistance was evaluated as "A."

[Examples 2 to 10 and 18 to 23, and Comparative Examples 1 to 6]

Each of liquid crystal alignment agents was obtained by carrying out preparation using the same solvent composition and concentration of solid contents as in Example 1 except that formulation was changed as shown in Table 3. In addition, solvent resistance of a film was evaluated using each of the liquid crystal alignment agents in the same manner as in Example 1, and an optical-vertical-type liquid crystal display element was manufactured in the same manner as in Example 1 to perform various evaluations. The results are shown in Table 4.

[Comparative Example 7 (In a Case of Using Optically Aligning Group-Containing Polyamic Acid)]

A liquid crystal alignment agent was prepared by using the same solvent composition and concentration of solid contents as in Example 1 except that a polymer used was changed to 100 parts by mass of the polymer (PAA-1) and 500 parts by mass of the polymer (PAA-2). In addition, solvent resistance of a film was evaluated using the prepared liquid crystal alignment agent in the same manner as in Example 1, and an optical-vertical-type liquid crystal display element was manufactured in the same manner as in Example 1 to perform various evaluations. As a result, in Comparative Example 7, solvent resistance of the liquid crystal alignment film was evaluated as "A," liquid crystal alignment properties were evaluated as "A," voltage holding ratio was evaluated as "C," and placing resistance was evaluated as "C."

<Manufacture and Evaluation of Optical-Horizontal-Type Liquid Crystal Display Element>

[Example 11]

1. Preparation of Liquid Crystal Alignment Agent (AL-11)

A liquid crystal alignment agent (AL-11) was prepared by using the same solvent composition and concentration of solid contents as in Example 1 except that a polymer used was changed to 100 parts by mass of the polymer (P-9) obtained in Synthesis Example 2-9 described above and 500 parts by mass of the polymer (PAA-2) obtained in Synthesis Example 2-22 described above.

2. Solvent Resistance of Liquid Crystal Alignment Film

The solvent resistance of the liquid crystal alignment film was evaluated in the same manner as in Example 1 except that (AL-11) was used instead of (AL-1) as the liquid crystal alignment agent. As a result, in this example, the solvent resistance of the film was "possible (B)."

3. Manufacture of Optical-Horizontal-Type Liquid Crystal Display Element

The liquid crystal alignment agent (AL-11) prepared above was applied with a spinner on a transparent electrode surface of a glass substrate having a transparent electrode, which is made of an ITO film. The substrate was pre-baked on a hot plate at 80° C. for 1 minute. Thereafter, the substrate was heated at 230° C. for 1 hour in an oven in which an inside thereof was purged with nitrogen. Therefore, a coated film having a film thickness of 0.1 μm was formed. Subsequently, a surface of the coated film was irradiated with 1000 J/m$^2$ of polarized ultraviolet rays having bright lines of 313 nm by using a Hg-Xe lamp and a Glan-Taylor prism in a direction tilted by 90° from a normal line of the substrate, and was subjected to heat treatment on a hot plate at 150° C. for 10 minutes after the irradiation with polarized ultraviolet rays. By repeating these series of operations, a pair of substrates (two sheets) having a liquid crystal alignment film were prepared.

An epoxy resin adhesive containing an aluminum oxide sphere having a diameter of 3.5 μm was applied to an outer periphery of a surface having the liquid crystal alignment film thereon of one sheet of the substrates, by screen printing. Thereafter, surfaces of the liquid crystal alignment films of the pair of the substrates were allowed to face each other to be pressed such that a projection direction of an optical axis of ultraviolet rays on each substrate to the substrate surface became horizontal. The adhesive was thermally cured at 150° C. for 1 hour. Subsequently, a gap between the substrates was filled with a positive liquid crystal (MLC-7028-100 manufactured by Merck KGaA) from a liquid crystal injection port. Thereafter, a liquid crystal inlet was sealed with an epoxy adhesive. In addition, the liquid crystal inlet was heated at 130° C. and then gradually cooled to room temperature in order to remove flow alignment at the time of liquid crystal injection. Subsequently, a polarizer was laminated on both outer surfaces of the substrate such that polarization directions thereof became orthogonal to each other, and such that an angle of 90° with respect to the projection direction of the optical axis of ultraviolet rays of the liquid crystal alignment film on the substrate surface is formed. Therefore, a liquid crystal display element was manufactured.

4. Evaluation of Liquid Crystal Alignment Properties

With respect to the optical-horizontal-type liquid crystal display element manufactured as described above, the liquid crystal alignment properties were evaluated in the same manner as in Example 1 described above. As a result, in this example, the liquid crystal alignment properties were "good (A)."

5. Evaluation of Voltage Holding Ratio (VHR)

With respect to the optical-horizontal-type liquid crystal display element manufactured as described above, the voltage holding ratio was evaluated in the same manner as in Example 1 described above. As a result, in this example, the voltage holding ratio was evaluated as "excellent (A)."

6. Evaluation of Placing Resistance

With respect to the optical-horizontal-type liquid crystal display element manufactured as described above, the placing resistance was evaluated in the same manner as in Example 1 described above. As a result, in this example, the placing resistance was evaluated as "good (A)."

[Examples 12 to 17]

Each of liquid crystal alignment agents was obtained by carrying out preparation using the same solvent composition and concentration of solid contents as in Example 1 except that formulation was changed as shown in Table 3. In addition, solvent resistance of a film was evaluated using each of the liquid crystal alignment agents in the same manner as in Example 1, and an optical-horizontal-type liquid crystal display element was manufactured in the same manner as in Example 11 to perform various evaluations. The results are shown in Table 4. In Examples 12 and 17, a liquid crystal cell was constructed without performing heat treatment after irradiation with polarized ultraviolet rays.

TABLE 3

| | Liquid crystal alignment agent | Polymer [P] | | Other polymer 1 | | Other polymer 2 | |
|---|---|---|---|---|---|---|---|
| | | Type | Parts by mass | Type | Parts by mass | Type | Parts by mass |
| Example 1 | AL-1 | P-1 | 100 | — | — | — | — |
| Example 2 | AL-2 | P-1 | 100 | — | — | PAA-2 | 500 |

TABLE 3-continued

| | Liquid crystal alignment agent | Polymer [P] Type | Polymer [P] Parts by mass | Other polymer 1 Type | Other polymer 1 Parts by mass | Other polymer 2 Type | Other polymer 2 Parts by mass |
|---|---|---|---|---|---|---|---|
| Example 3 | AL-3 | P-1 | 100 | — | — | PAA-2 | 1000 |
| Example 4 | AL-4 | P-2 | 100 | — | — | PAA-2 | 1000 |
| Example 5 | AL-5 | P-3 | 100 | — | — | PAA-2 | 1000 |
| Example 6 | AL-6 | P-4 | 100 | — | — | PAA-2 | 1000 |
| Example 7 | AL-7 | P-5 | 100 | — | — | PAA-2 | 1000 |
| Example 8 | AL-8 | P-6 | 100 | — | — | PAA-2 | 1000 |
| Example 9 | AL-9 | P-7 | 100 | — | — | PAA-2 | 1000 |
| Example 10 | AL-10 | P-8 | 100 | — | — | PAA-2 | 1000 |
| Example 11 | AL-11 | P-9 | 100 | — | — | PAA-2 | 500 |
| Example 12 | AL-12 | P-10 | 100 | — | — | PAA-2 | 500 |
| Example 13 | AL-13 | P-11 | 100 | — | — | PAA-2 | 1000 |
| Example 14 | AL-14 | P-12 | 100 | — | — | PAA-2 | 1000 |
| Example 15 | AL-15 | P-13 | 100 | — | — | PAA-2 | 1000 |
| Example 16 | AL-16 | P-14 | 100 | — | — | PAA-2 | 500 |
| Example 17 | AL-17 | P-15 | 100 | — | — | PAA-2 | 500 |
| Example 18 | AL-18 | P-16 | 100 | — | — | PAA-2 | 500 |
| Example 19 | AL-19 | P-17 | 100 | — | — | PAA-2 | 500 |
| Example 20 | AL-20 | P-18 | 100 | — | — | PAA-2 | 500 |
| Example 21 | AL-21 | P-19 | 100 | — | — | PAA-2 | 500 |
| Example 22 | AL-22 | P-20 | 100 | — | — | PAA-2 | 500 |
| Example 23 | AL-23 | P-21 | 100 | — | — | PAA-2 | 500 |
| Comparative Example 1 | BL-1 | — | — | C-1 | 100 | — | — |
| Comparative Example 2 | BL-2 | — | — | C-2 | 100 | — | — |
| Comparative Example 3 | BL-3 | — | — | C-3 | 100 | — | — |
| Comparative Example 4 | BL-4 | — | — | C-4 | 100 | — | — |
| Comparative Example 5 | BL-5 | — | — | C-5 | 100 | — | — |
| Comparative Example 6 | BL-6 | — | — | C-5 | 100 | PAA-2 | 500 |
| Comparative Example 7 | BL-7 | — | — | PAA-1 | 100 | PAA-2 | 500 |

In Table 3, numerical values in the polymer column indicate a blending proportion (parts by mass) of the polymer (PAA-2) with respect to 100 parts by mass of the polymer [P] used for preparing the liquid crystal aligning agent in the case of Examples 2 to 23, and indicate a blending proportion (parts by mass) of the polymer (PAA-2) with respect to 100 parts by mass of the polymer (C-5) or the polymer (PAA-1) used for preparing the liquid crystal aligning agent in the case of Comparative Examples 6 and 7. All of concentrations of solid contents of the liquid crystal alignment agents were the same (4.0% by mass) in each example.

TABLE 4

| | Evaluation process | Solvent resistance | Liquid crystal alignment properties | VHR | Placing resistance |
|---|---|---|---|---|---|
| Example 1 | Optically vertical | B | A | B | A |
| Example 2 | Optically vertical | A | A | A | A |
| Example 3 | Optically vertical | A | A | A | A |
| Example 4 | Optically vertical | A | A | A | A |
| Example 5 | Optically vertical | A | A | A | A |
| Example 6 | Optically vertical | B | A | A | A |
| Example 7 | Optically vertical | B | A | A | A |
| Example 8 | Optically vertical | B | A | A | A |
| Example 9 | Optically vertical | A | A | A | A |
| Example 10 | Optically vertical | A | A | A | A |
| Example 11 | Optically horizontal | B | A | A | A |
| Example 12 | Optically horizontal | B | A | A | A |
| Example 13 | Optically horizontal | A | A | B | A |
| Example 14 | Optically horizontal | A | A | A | A |
| Example 15 | Optically horizontal | A | A | A | A |
| Example 16 | Optically horizontal | A | A | B | A |
| Example 17 | Optically horizontal | A | A | B | A |
| Example 18 | Optically vertical | A | A | A | A |
| Example 19 | Optically vertical | A | A | A | A |
| Example 20 | Optically vertical | A | A | A | A |
| Example 21 | Optically vertical | A | A | A | A |
| Example 22 | Optically vertical | A | A | A | A |
| Example 23 | Optically vertical | A | A | A | A |
| Comparative Example 1 | Optically vertical | C | B | D | C |
| Comparative Example 2 | Optically vertical | C | B | D | C |
| Comparative Example 3 | Optically vertical | B | B | D | C |
| Comparative Example 4 | Optically vertical | B | B | D | C |
| Comparative Example 5 | Optically vertical | A | C | B | — |
| Comparative Example 6 | Optically vertical | A | C | A | — |
| Comparative Example 7 | Optically vertical | A | A | C | C |

In the case of Comparative Examples 5 and 6, the placing resistance was evaluated as "–" in Table 4, because the obtained liquid crystal display element was in a state where the liquid crystal alignment properties were poor and the pretilt angle θ2 could not be measured.

As can be understood from the results of the above-described examples, the liquid crystal display element manufactured using the liquid crystal alignment agent containing the polymer [P] had a balance between the solvent resistance, liquid crystal alignment properties, and voltage holding characteristics, as compared with the liquid crystal display element of the comparative examples, which was produced using the liquid crystal alignment agent not containing the polymer [P]. In addition, the liquid crystal display element of the examples had more favorable placing resistance than that of the comparative examples. Based on these findings, it was found that it is possible to form the liquid crystal alignment film having excellent solvent resistance, liquid crystal alignment properties, voltage holding ratio, and placing resistance according to the liquid crystal alignment agent containing the polymer [P].

What is claimed is:

1. A liquid crystal alignment agent, comprising a polymer [P],
the polymer [P] comprising:
at least one ring structure (A) of an oxetane ring and an oxirane ring;
a functional group (B) that reacts with at least one of the oxetane ring and the oxirane ring by heating; and
an optically aligning group (C),
wherein the polymer [P] is at least one kind selected from the group consisting of a maleimide polymer and a styrene-maleimide polymer, and
the functional group (B) is at least one kind selected from the group consisting of a carboxyl group and a protected carboxyl group.

2. The liquid crystal alignment agent according to claim 1, wherein the polymer [P] has a constitutional unit derived from a maleimide compound having the optically aligning group (C).

3. The liquid crystal alignment agent according to claim 1, further containing a polymer [Q] different from the polymer [P].

4. The liquid crystal alignment agent according to claim 3, wherein the polymer [Q] is at least one polymer selected from the group consisting of a polyamic acid, a polyamic acid ester, a polyimide, and a polymer having a structural unit derived from a monomer having an unsaturated bond.

5. A liquid crystal alignment film which is formed from the liquid crystal alignment agent according to claim 1.

6. A liquid crystal element comprising the liquid crystal alignment film according to claim 5.

7. The liquid crystal alignment agent according to claim 2, further containing a polymer [Q] different from the polymer [P].

8. The liquid crystal alignment agent according to claim 7, wherein the polymer [Q] is at least one polymer selected from the group consisting of a polyamic acid, a polyamic acid ester, a polyimide, and a polymer having a structural unit derived from a monomer having an unsaturated bond.

* * * * *